(12) United States Patent
Akiyama et al.

(10) Patent No.: US 8,264,799 B2
(45) Date of Patent: Sep. 11, 2012

(54) MAGNETIC RECORDING HEAD

(75) Inventors: Junichi Akiyama, Kanagawa-ken (JP);
Kenichiro Yamada, Tokyo (JP);
Masayuki Takagishi, Tokyo (JP);
Hitoshi Iwasaki, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1079 days.

(21) Appl. No.: 12/109,760

(22) Filed: Apr. 25, 2008

(65) Prior Publication Data
US 2008/0268291 A1 Oct. 30, 2008

(30) Foreign Application Priority Data
Apr. 27, 2007 (JP) ................................. 2007-120307

(51) Int. Cl.
*G11B 5/33* (2006.01)
(52) U.S. Cl. ..................................................... 360/324.1
(58) Field of Classification Search .......................... None
See application file for complete search history.

(56) References Cited

U.S. PATENT DOCUMENTS

| | | | |
|---|---|---|---|
| 4,103,315 A * | 7/1978 | Hempstead et al. | 360/110 |
| 4,945,528 A | 7/1990 | Crasemann | |
| 5,695,864 A * | 12/1997 | Slonczewski | 428/212 |
| 5,748,399 A * | 5/1998 | Gill | 360/66 |
| 5,768,066 A * | 6/1998 | Akiyama et al. | 360/314 |
| 5,898,546 A * | 4/1999 | Kanai et al. | 360/324.1 |
| 5,920,447 A | 7/1999 | Sakata et al. | |
| 6,011,664 A | 1/2000 | Kryder et al. | |
| 6,094,328 A | 7/2000 | Saito | |
| 6,153,062 A | 11/2000 | Saito | |
| 6,278,576 B1 | 8/2001 | Ogata et al. | |
| 6,282,069 B1 | 8/2001 | Nakazawa et al. | |
| 6,519,119 B1 | 2/2003 | van der Heijden et al. | |
| 6,580,589 B1 * | 6/2003 | Gill | 360/324.11 |
| 6,583,969 B1 | 6/2003 | Pinarbasi | |
| 6,591,479 B2 | 7/2003 | Nakazawa et al. | |
| 6,608,739 B1 | 8/2003 | Tanaka et al. | |
| 6,621,664 B1 | 9/2003 | Trindade et al. | |
| 6,697,231 B1 | 2/2004 | Kikuiri | |
| 6,785,092 B2 | 8/2004 | Covington et al. | |
| 6,809,900 B2 | 10/2004 | Covington | |
| 6,927,952 B2 | 8/2005 | Shimizu et al. | |
| 6,937,446 B2 | 8/2005 | Kamiguchi et al. | |
| 6,977,108 B2 | 12/2005 | Hieda et al. | |

(Continued)

FOREIGN PATENT DOCUMENTS
JP    64-070947    3/1989
(Continued)

OTHER PUBLICATIONS

Office Action dated Jul. 31, 2009 in Korean Application No. 10-2008-38806 and partial English-language translation thereof.

(Continued)

*Primary Examiner* — David D Davis
(74) *Attorney, Agent, or Firm* — Nixon & Vanderhye, P.C.

(57) ABSTRACT

A magnetic device includes a first magnetic layer having at least one magnetic material layer, a second magnetic layer having at least one magnetic material layer, a first nonmagnetic layer provided between the first magnetic layer and the second magnetic layer, a third magnetic layer including a ferromagnetic material with a fixed magnetization direction, and a pair of electrodes. The pair of electrodes are operable to pass a current through a laminated body including the first and second magnetic layers, the nonmagnetic layer, and the third magnetic layer.

16 Claims, 19 Drawing Sheets

U.S. PATENT DOCUMENTS

| | | | |
|---|---|---|---|
| 6,982,845 B2 | 1/2006 | Kai et al. | |
| 7,106,555 B2 | 9/2006 | Kikuiri et al. | |
| 7,119,990 B2 | 10/2006 | Bajorek et al. | |
| 7,145,752 B2 | 12/2006 | Ueda et al. | |
| 7,154,707 B2 | 12/2006 | Watabe et al. | |
| 7,256,955 B2 | 8/2007 | Pokhil et al. | |
| 7,397,633 B2 | 7/2008 | Xue et al. | |
| 7,461,933 B2 | 12/2008 | Deily et al. | |
| 7,466,525 B2 | 12/2008 | Hasegawa et al. | |
| 7,471,491 B2 | 12/2008 | Sato et al. | |
| 7,473,478 B2 | 1/2009 | Sbiaa et al. | |
| 7,486,475 B2 | 2/2009 | Biskeborn | |
| 7,504,898 B2 | 3/2009 | Fukuzawa et al. | |
| 7,532,433 B2 | 5/2009 | Kawato et al. | |
| 7,532,434 B1 | 5/2009 | Schreck et al. | |
| 7,593,185 B2 | 9/2009 | Yazawa | |
| 7,616,412 B2 | 11/2009 | Zhu et al. | |
| 7,675,129 B2 | 3/2010 | Inomata et al. | |
| 7,724,469 B2 | 5/2010 | Gao et al. | |
| 7,732,881 B2 | 6/2010 | Wang | |
| 7,764,136 B2 | 7/2010 | Suzuki | |
| 7,791,829 B2 | 9/2010 | Takeo et al. | |
| 7,808,330 B2 | 10/2010 | Fukuzawa et al. | |
| 7,911,882 B2 | 3/2011 | Shimazawa et al. | |
| 7,957,098 B2 | 6/2011 | Yamada et al. | |
| 2001/0017752 A1 | 8/2001 | Hoshiya et al. | |
| 2002/0006013 A1 | 1/2002 | Sato et al. | |
| 2002/0051330 A1 | 5/2002 | Heijden et al. | |
| 2002/0075595 A1 | 6/2002 | Sato et al. | |
| 2002/0097536 A1 | 7/2002 | Komuro et al. | |
| 2002/0136927 A1 | 9/2002 | Hieda et al. | |
| 2003/0026040 A1 | 2/2003 | Covington et al. | |
| 2003/0090844 A1 | 5/2003 | Shimizu et al. | |
| 2004/0150912 A1 | 8/2004 | Kawato et al. | |
| 2004/0190197 A1 | 9/2004 | Watabe et al. | |
| 2004/0228045 A1* | 11/2004 | Hasegawa et al. | 360/324.1 |
| 2005/0023938 A1 | 2/2005 | Sato et al. | |
| 2005/0105213 A1 | 5/2005 | Takeo et al. | |
| 2005/0110004 A1 | 5/2005 | Parkin et al. | |
| 2005/0207050 A1 | 9/2005 | Pokhil | |
| 2005/0219771 A1* | 10/2005 | Sato et al. | 360/324.2 |
| 2006/0171051 A1 | 8/2006 | Wachenschwanz et al. | |
| 2006/0198047 A1 | 9/2006 | Xue et al. | |
| 2006/0221507 A1 | 10/2006 | Sato et al. | |
| 2007/0063237 A1 | 3/2007 | Huai et al. | |
| 2007/0109147 A1 | 5/2007 | Fukuzawa et al. | |
| 2008/0019040 A1 | 1/2008 | Zhu et al. | |
| 2008/0112087 A1 | 5/2008 | Clinton et al. | |
| 2008/0117545 A1 | 5/2008 | Batra et al. | |
| 2008/0129401 A1 | 6/2008 | Fukuzawa et al. | |
| 2008/0137224 A1 | 6/2008 | Gao et al. | |
| 2008/0150643 A1 | 6/2008 | Suzuki et al. | |
| 2008/0218891 A1 | 9/2008 | Gubbins et al. | |
| 2008/0268291 A1 | 10/2008 | Akiyama et al. | |
| 2008/0304176 A1* | 12/2008 | Takagishi et al. | 360/86 |
| 2009/0052095 A1 | 2/2009 | Yamada et al. | |
| 2009/0059417 A1 | 3/2009 | Takeo et al. | |
| 2009/0059418 A1 | 3/2009 | Takeo et al. | |
| 2009/0059423 A1 | 3/2009 | Yamada et al. | |
| 2009/0080105 A1 | 3/2009 | Takashita et al. | |
| 2009/0080106 A1 | 3/2009 | Shimizu et al. | |
| 2009/0080120 A1 | 3/2009 | Funayama et al. | |
| 2009/0088095 A1 | 4/2009 | Kayano | |
| 2009/0097167 A1 | 4/2009 | Sato et al. | |
| 2009/0097169 A1 | 4/2009 | Sato et al. | |
| 2009/0115541 A1 | 5/2009 | Persson et al. | |
| 2009/0225465 A1 | 9/2009 | Iwasaki et al. | |
| 2009/0257151 A1 | 10/2009 | Zhang et al. | |
| 2009/0262457 A1 | 10/2009 | Rivkin et al. | |
| 2009/0316303 A1 | 12/2009 | Yamada et al. | |
| 2009/0316304 A1 | 12/2009 | Funayama et al. | |
| 2010/0007992 A1 | 1/2010 | Yamada et al. | |
| 2010/0007996 A1 | 1/2010 | Iwasaki et al. | |
| 2010/0110592 A1 | 5/2010 | Koui et al. | |
| 2010/0134922 A1 | 6/2010 | Yamada et al. | |
| 2010/0220415 A1 | 9/2010 | Yamada et al. | |
| 2011/0038080 A1 | 2/2011 | Alex et al. | |
| 2011/0205655 A1 | 8/2011 | Shimizu et al. | |
| 2011/0299192 A1 | 12/2011 | Yamada et al. | |
| 2011/0300409 A1 | 12/2011 | Yamada et al. | |

FOREIGN PATENT DOCUMENTS

| | | |
|---|---|---|
| JP | 05-20635 | 1/1993 |
| JP | 07-244801 | 9/1995 |
| JP | 2002-100005 | 4/2002 |
| JP | 2002-208744 | 7/2002 |
| JP | 2002-279616 | 9/2002 |
| JP | 2004-192744 | 7/2004 |
| JP | 2004-207707 | 7/2004 |
| JP | 2004-295987 | 10/2004 |
| JP | 2005-108315 | 4/2005 |
| JP | 2005-525663 | 8/2005 |
| JP | 2005-285242 | 10/2005 |
| JP | 2005-310363 | 11/2005 |
| JP | 2006-147023 | 6/2006 |
| JP | 2006-209960 | 8/2006 |
| JP | 2006-209964 | 8/2006 |
| JP | 2006-286855 | 10/2006 |
| JP | 3833512 | 10/2006 |
| JP | 2007-012264 | 1/2007 |
| JP | 2007-035251 | 2/2007 |
| JP | 2007-124340 | 5/2007 |
| JP | 2007-184923 | 7/2007 |
| JP | 2007-193906 | 8/2007 |
| JP | 2008-123669 | 5/2008 |
| JP | 2008-176908 | 7/2008 |
| KR | 1020030039289 | 5/2003 |
| WO | 2006-101040 | 9/2006 |

OTHER PUBLICATIONS

Jian-Gang (Jimmy) Zhu, et al., The Magnetic Recording Conference (TMRC2007), B6 "Microwave Assisted Magnetic Recording (MAMR)," (May 21, 2007).

X. Zhu and J.-G. Zhu, "Bias-Field-Free Microwave Oscillator Driven by Perpendicularly Polarized Spin Current," IEEE Trans. Magn. vol. 42, p. 2670 (2006).

Zhu et al., "Microwave Assisted Magnetic Recording (MAMR)," Digest of the 18$^{th}$ Magnetic Recording conference, pp. 34-35, 2007.

Yamada et al., U.S. Appl. No. 12/153,490, filed May 20, 2008.
Yamada et al., U.S. Appl. No. 12/155,329, filed Jun. 2, 2008.
Takagishi et al., U.S. Appl. No. 12/155,473, filed Jun. 4, 2008.
Takeo et al., U.S. Appl. No. 12/196,628, filed Aug. 22, 2008.
Takeo et al., U.S. Appl. No. 12/196,841, filed Aug. 22, 2008.
Iwasaki et al., U.S. Appl. No. 12/232,014 filed Sep. 9, 2008.
Takashita et al., U.S. Appl. No. 12/232,391, filed Sep. 16, 2008.
Funayama et al., U.S. Appl. No. 12/232,392, filed Sep. 16, 2008.
Shimizu et al., U.S. Appl. No. 12/232,469, filed Sep. 17, 2008.
Yamada et al., U.S. Appl. No. 12/780,269, filed May 13, 2010.
Maat et al., "Magnetotransport properties and spin-torque effects in current perpendicular to the plane spin valves with Co-Fe-Al magnetic layers", Journal of Applied Physics 101, 093905; May 9, 2007.
Park et al., "Effect of Adjacent Layers on Crystallization and Magnetoresistance in CoFeB/MgO/CoFeB Magnetic Tunnel Junction", IEEE Transactions of Magnetics, vol. 42, No. 10, Oct. 2006.
Shen et al., "Effect of Film Roughness in MgO-based Magnetic Tunnel Junctions", Applied Physics Letters 88, 182508 (2006).
Yamada et al., U.S. Appl. No. 12/382,940, filed Mar. 26, 2009.
Iwasaki et al., U.S. Appl. No. 12/457,657, filed Jun. 17, 2009.
Takagishi et al., U.S. Appl. No. 12/461,027, filed Jul. 29, 2009.
Yamada et al., U.S. Appl. No. 13/214,012, filed Aug. 19, 2011.
Yamada et al., U.S. Appl. No. 13/214,033, filed Aug. 19, 2011.

* cited by examiner

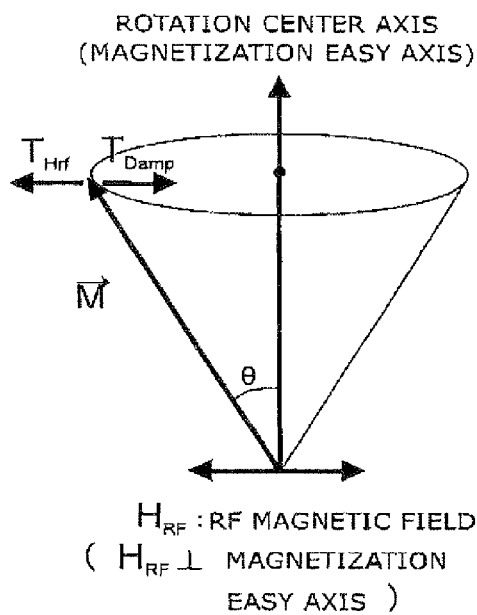
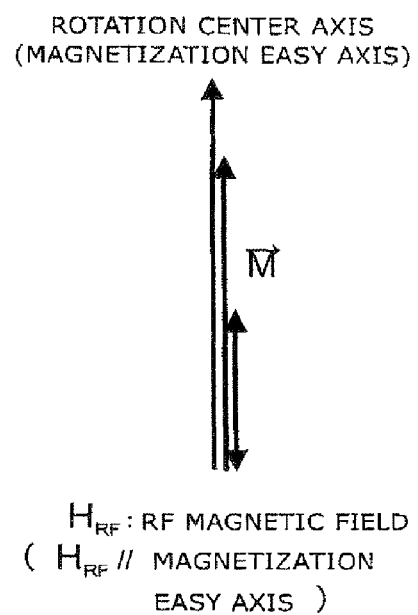
FIG. 6A
FIG. 6B
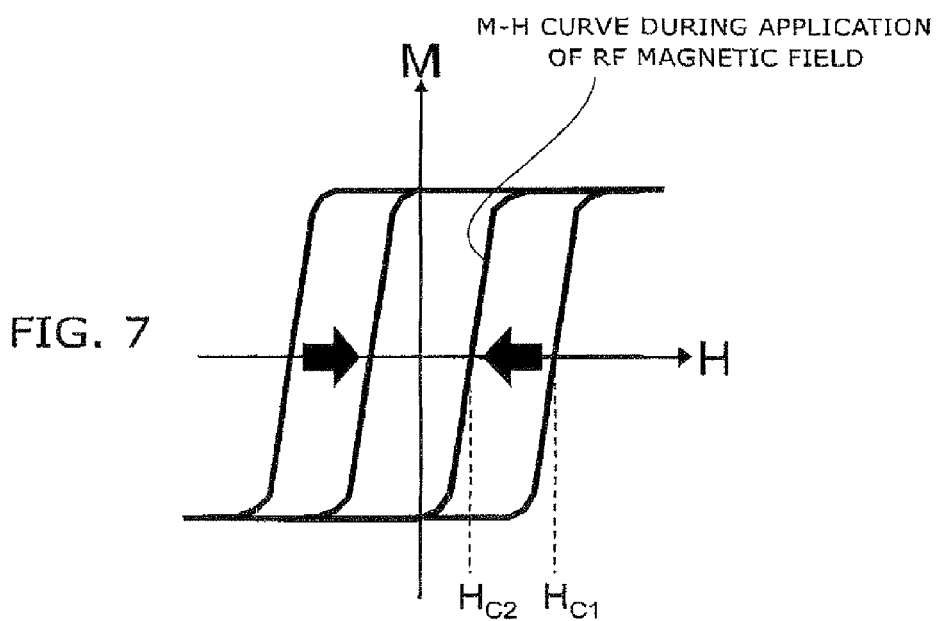
FIG. 7

MAGNETIC RECORDING HEAD

CROSS-REFERENCE TO RELATED APPLICATIONS

This application is based upon and claims the benefit of priorities from the prior Japanese Patent Application No. 2007-120307, filed on Apr. 27, 2007; the entire contents of which are incorporated herein by reference.

BACKGROUND OF THE INVENTION

1. Field of the Invention

This invention relates to a magnetic device, a magnetic recording head, and a magnetic recording apparatus of the microwave assisted type suitable for realizing data storage with high recording density, high recording capacity, and high data transfer rate.

2. Background Art

In the 1990s, the practical application of MR (magnetoresistive effect) heads and GMR (giant magnetoresistive effect) heads triggered a dramatic increase in the recording density and recording capacity of HDD (hard disk drive). However, in the early 2000s, the problem of thermal fluctuations in magnetic recording media became manifest, and hence the increase of recording density temporarily slowed down. Nevertheless, perpendicular magnetic recording, which is in principle more advantageous to high-density recording than longitudinal magnetic recording, was put into practical use in 2005. It serves as an engine for the increase of HDD recording density, which exhibits an annual growth rate of approximately 40% these days.

Furthermore, the latest demonstration experiments have achieved a recording density exceeding 400 Gbits/inch$^2$. If the development continues steadily, the recording density is expected to reach 1 Tbits/inch$^2$ around 2012. However, it is considered that such a high recording density is not easy to achieve even by using perpendicular magnetic recording because the problem of thermal fluctuations becomes manifest again.

As recording schemes possibly solving the above problem, the "patterned medium recording" and the "thermally assisted magnetic recording" are proposed. Both schemes are currently under active research and development in Japan and abroad. In the case of the patterned medium recording, it is an urgent need to commercialize a medium manufacturing process technology for cost-effectively manufacturing a fine pattern of isolated bits measuring 20 nanometers or less with precision on the order of nanometers to subnanometers.

On the other hand, in the case of the thermally assisted magnetic recording by light irradiation, it is essential to commercialize a hybrid magnetic head in which a near-field optical device for instantaneously heating a microscopic area of the medium to decrease its coercivity is placed close to a recording magnetic pole for applying a recording magnetic field to the area of decreased coercivity. Furthermore, in the thermally assisted magnetic recording, it is also important to develop a recording magnetic material having a very high magnetic anisotropy energy (Ku), which cannot be written by the conventional magnetic heads.

In contrast, as a recording scheme different from the thermally assisted magnetic recording, the "microwave assisted magnetic recording" is proposed (e.g., U.S. Pat. No. 6,011,664). In this technique, a radio-frequency magnetic field having a frequency sufficiently higher than the recording signal frequency is applied to a prescribed microscopic site of the magnetic recording medium to decrease the coercivity of the site in the recording signal frequency region from its original coercivity Hc1 to the half or less, Hc2. Application of a recording magnetic field to this site at the time of decreasing the coercivity enables magnetic recording to a magnetic medium having a higher magnetic anisotropy energy (Ku) and a higher-density recording potential.

As a method for applying a radio-frequency magnetic field, U.S. Pat. No. 6,011,664 discloses passing a radio-frequency current through a coil coupled to a magnetic pole to excite the magnetic pole and applying the radio-frequency magnetic field generated from the magnetic pole to the magnetic recording medium. However, in this method, as the medium recording site is downsized to increase the recording density, the strength of the radio-frequency magnetic field applicable to the site sharply decreases. Hence, unfortunately, it is difficult to decrease the coercivity of the recording site, that is, to achieve microwave assisted magnetic recording.

To solve this problem, a technique of using a spin oscillator as an oscillation source for a radio-frequency magnetic field is proposed (US Patent Application Publication No. 2005/0023938, and US Patent Application Publication No. 2005/0219771).

US Patent Application Publication No. 2005/0023938 and US Patent Application Publication No. 2005/0219771 disclose a method for using a spin oscillator as a source for generating a radio-frequency magnetic field. Upon passage of a DC current, the spin of electrons passing through a spin polarization layer is polarized. A spin oscillation layer receives a spin torque by the polarized electron flow, and its magnetization undergoes ferromagnetic resonance. Consequently, the spin oscillator, which is composed of the spin oscillation layer laminated with the spin polarization layer via a nonmagnetic layer, generates a radio-frequency magnetic field from the spin oscillation layer.

This phenomenon prominently emerges for the device size of several ten nanometers or less. Hence the range of the radio-frequency magnetic field generated from the device is limited to within a microscopic region of several ten nanometers or less from the device. The oscillation frequency is set equal to or near the ferromagnetic resonance frequency of the recording layer of the magnetic recording medium, and the magnetic recording head with the spin oscillator placed near the recording magnetic pole is closely opposed to the magnetic recording medium. Then the radio-frequency magnetic field generated from the spin oscillator can be applied only to the microscopic recording site of the medium recording layer. Consequently, it is possible to decrease only the coercivity of the microscopic recording site.

At this time of decreasing the coercivity, a recording magnetic field is applied to this recording site using the recording magnetic pole. This enables magnetization reversal of only the recording site, that is, writing of information.

Furthermore, the power consumption of the spin oscillator is as low as that of the conventional GMR devices and TMR (tunneling magnetoresistive effect) devices, and the heat generation is also negligible. Moreover, the head structure with the spin oscillator placed close to the recording magnetic pole can be fabricated in a manufacturing process similar to that for the conventional magnetic heads. Thus the manufacturing cost is also very inexpensive. Hence the microwave assisted magnetic recording based on the spin oscillator is promising as a future magnetic recording scheme.

SUMMARY OF THE INVENTION

According to an aspect of the invention, there is provided a magnetic device including: a first magnetic layer having at least one magnetic material layer; a second magnetic layer having at least one magnetic material layer; a first nonmagnetic layer provided between the first magnetic layer and the second magnetic layer; a third magnetic layer including a ferromagnetic material with a fixed magnetization direction; and a pair of electrodes operable to pass a current through a laminated body including the first and second magnetic layers, the nonmagnetic layer, and the third magnetic layer.

According to another aspect of the invention, there is provided a magnetic recording head including: a recording magnetic pole; a magnetic device juxtaposed with the recording magnetic pole; and a magnetic reproducing device, the magnetic device including: a first magnetic layer having at least one magnetic material layer; a second magnetic layer having at least one magnetic material layer; a first nonmagnetic layer provided between the first magnetic layer and the second magnetic layer; a third magnetic layer including a ferromagnetic material with a fixed magnetization direction; and a pair of electrodes operable to pass a current through a laminated body including the first and second magnetic layers, the nonmagnetic layer, and the third magnetic layer.

According to another aspect of the invention, there is provided a magnetic recording apparatus including: a perpendicular magnetic recording medium; a magnetic recording head including: a recording magnetic pole; a magnetic device juxtaposed with the recording magnetic pole; and a magnetic reproducing device, the magnetic device including: a first magnetic layer having at least one magnetic material layer; a second magnetic layer having at least one magnetic material layer; a first nonmagnetic layer provided between the first magnetic layer and the second magnetic layer; a third magnetic layer including a ferromagnetic material with a fixed magnetization direction; and a pair of electrodes operable to pass a current through a laminated body including the first and second magnetic layers, the nonmagnetic layer, and the third magnetic layer; moving part configured to allow relative movement between the magnetic recording medium and the magnetic recording head, which are opposed to each other with a spacing therebetween or in contact with each other; control part configured to position the magnetic recording head at a prescribed recording position of the magnetic recording medium; and signal processing part configured to perform writing and reading of a signal on the magnetic recording medium by using the magnetic recording head, the oscillation frequency of the first and the second of magnetic layers is generally equal to the ferromagnetic resonance frequency of a recording magnetic grain or a recording magnetic dot constituting a recording magnetic layer of the magnetic recording medium.

BRIEF DESCRIPTION OF THE DRAWINGS

FIGS. 6A and 6B are schematic views for illustrating the relationship between the magnetization easy axis of the recording layer and the radio-frequency magnetic field;

FIG. 7 is a graph illustrating the decrease of coercivity in the recording layer;

DETAILED DESCRIPTION OF THE INVENTION

Figure 1A:
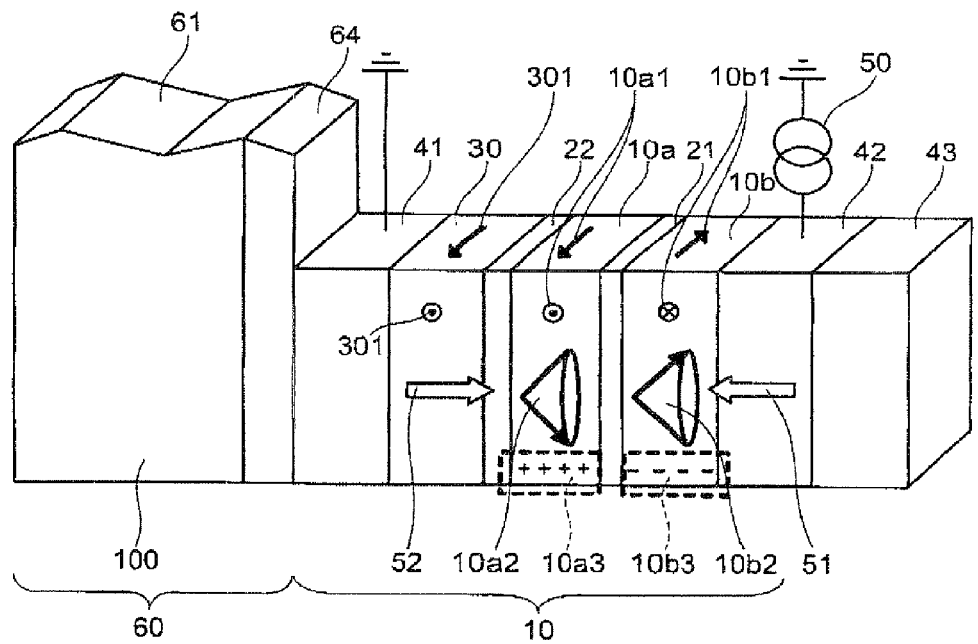
FIGS. 1A and 1B are perspective views of a magnetic device according to a first embodiment of the invention.

An embodiment of the invention will now be described with reference to the drawings, where like elements are marked with like reference numerals, and the detailed description thereof is omitted as appropriate.

Figure 1B:
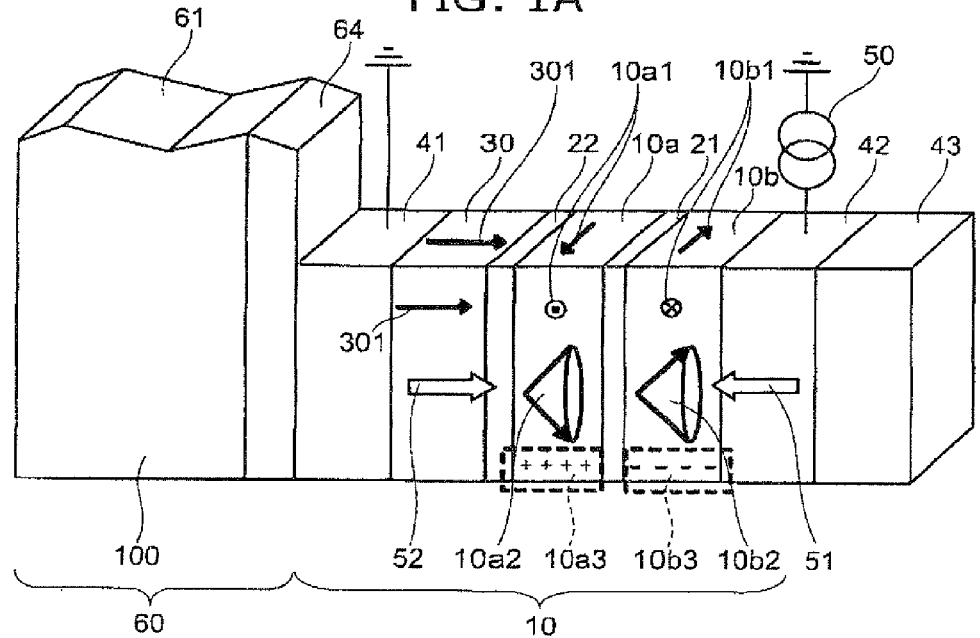

FIGS. 1A and 1B are perspective views of a magnetic device according to a first embodiment of the invention.

Figure 2:
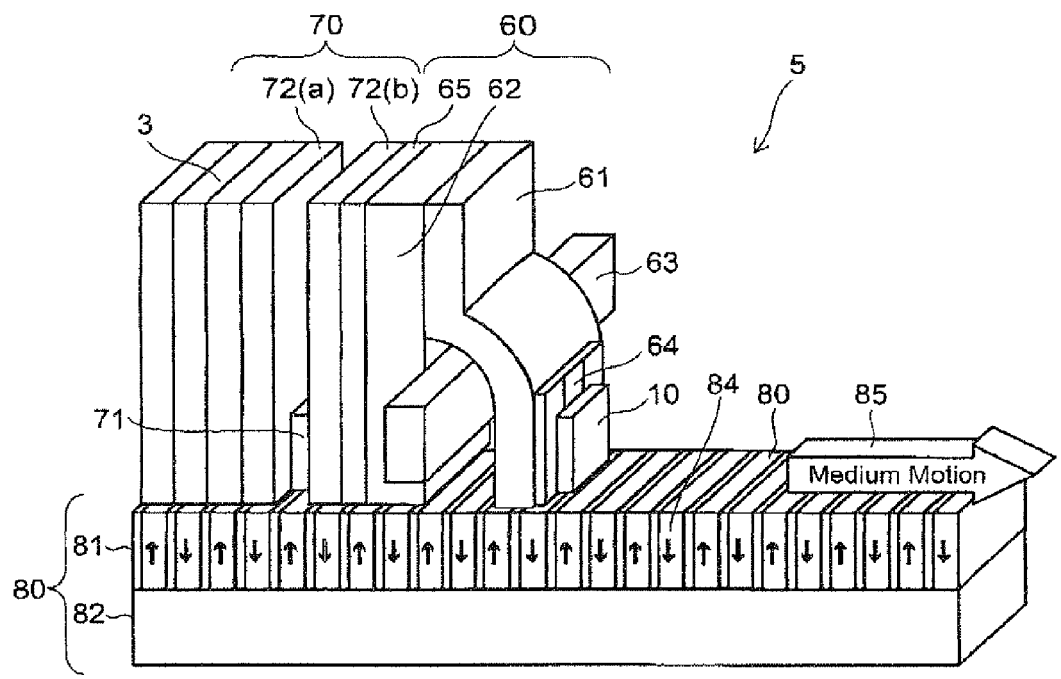
FIG. 2 is a perspective view showing the schematic configuration of a magnetic recording head provided with this magnetic device.

FIG. 2 is a perspective view showing the schematic configuration of a magnetic recording head provided with this magnetic device.

Figure 3:
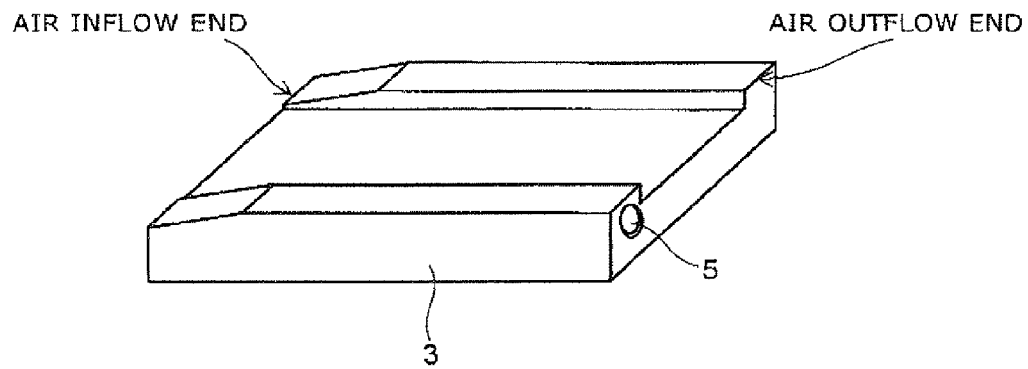
FIG. 3 is a perspective view illustrating a magnetic head slider on which this magnetic head is mounted.

FIG. 3 is a perspective view illustrating a magnetic head slider on which this magnetic head is mounted.

As illustrated in FIG. 2, the magnetic recording head 5 of the first embodiment comprises a reproducing head 70 with a magnetic reproducing device 71 such as a GMR device or a TMR device placed between magnetic shield layers 72a and 72b, a writing head 60 formed on the reproducing head 70 via an insulating layer 65, and a magnetic device 10 placed close to a recording magnetic pole 61 of the writing head 60 via an insulating layer 64.

As shown in FIG. 3, the magnetic recording head 5 is disposed illustratively on the side surface of the air outflow end of the head slider 3. The head slider 3, illustratively made of $Al_2O_3/TiC$, is designed and worked so that it can move relative to a magnetic recording medium such as a magnetic disk, not shown, while floating thereabove or being in contact therewith.

The writing head 60 comprises a magnetic core composed of a main magnetic pole 61 and a return path (auxiliary magnetic pole) 62, and a coil 63 for exciting it. The magnetic device 10 has a laminated structure sequentially including a first electrode layer 41 formed on the main magnetic pole 61 via the insulating layer 64 of $Al_2O_3$ or the like, a spin polarization layer (third magnetic layer) 30 with its magnetization 301 oriented generally parallel (FIG. 1A) or generally perpendicular (FIG. 1B) to the film plane, a nonmagnetic layer 22 (Cu, Au, Ag, etc.) having high spin transmissivity, a first spin oscillation layer (first magnetic layer) 10a, a first nonmagnetic layer 21, a second spin oscillation layer (second magnetic layer) 10b, and a second electrode layer 42.

The first electrode layer 41 and the second electrode layer 42 are made of Ti or Cu.

The first spin oscillation layer 10a can be formed from a magnetic layer with its magnetization 10a1 oriented in the film plane.

The first nonmagnetic layer 21 is made of a nonmagnetic metal layer of Cu or the like.

The second spin oscillation layer 10b can be formed from a magnetic layer with its magnetization 10b1 oriented in the film plane.

The first spin oscillation layer 10a and the second spin oscillation layer 10b are antiferromagnetically coupled and/or magnetostatically coupled to each other via the first nonmagnetic layer 21 (which is preferably made of a noble metal such as Cu, Pt, Au, Ag, Pd, or Ru, or can be made of a nonmagnetic transition metal such as Cr, Ru, Rh, Mo, or W) so that the respective magnetizations are antiparallel to each other. A constant current source 50 suitably disposed inside or outside the magnetic head can be used to pass a prescribed DC current through the pair of spin oscillation layers 10a, 10b via the electrode layer 41 and the electrode layer 42.

The antiferromagnetic coupling and/or magnetostatic coupling described above can be designed to achieve either or both of the couplings by suitably adjusting the material and thickness of the first nonmagnetic layer 21. Furthermore, the spin polarization layer 30 also serves as a magnetization pinning layer. Hence it is preferable to suitably select the material and thickness of the nonmagnetic layer 22 to avoid excessive magnetic coupling between the spin polarization layer 30 and the first spin oscillation layer 10a so that the magnetization 301 of the spin polarization layer is constantly stable.

The magnetic material layer used for the first spin oscillation layer 10a and the second spin oscillation layer 10b can be a soft magnetic layer of CoFe, CoNiFe, NiFe, CoZrNb, FeN, FeSi, or FeAlSi having a relatively high saturation magnetic flux density and having magnetic anisotropy directed in the film plane, or a CoCr-based magnetic alloy film with its magnetization oriented in the film plane. The first nonmagnetic layer and the second nonmagnetic layer are preferably made of a noble metal such as Cu, Pt, Au, Ag, Pd, or Ru, or can be made of a nonmagnetic transition metal such as Cr, Ru, Rh, Mo, or W.

For the spin polarization layer 30, it is possible to use a material layer having good perpendicular orientation with the magnetization oriented perpendicular to the film plane, such as a CoCrPt, CoCrTa, CoCrTaPt, CoCrTaNb, or other CoCr-based magnetic layer, a TbFeCo or other RE-TM amorphous alloy magnetic layer, or a Co/Pd, Co/Pt, CoCrTa/Pd, or other Co artificial lattice magnetic layer. If a higher magnetic anisotropy energy (Ku) is required, it is possible to suitably use a CoPt-based or FePt-based alloy magnetic layer, or a SmCo-based alloy magnetic layer.

Figure 4:
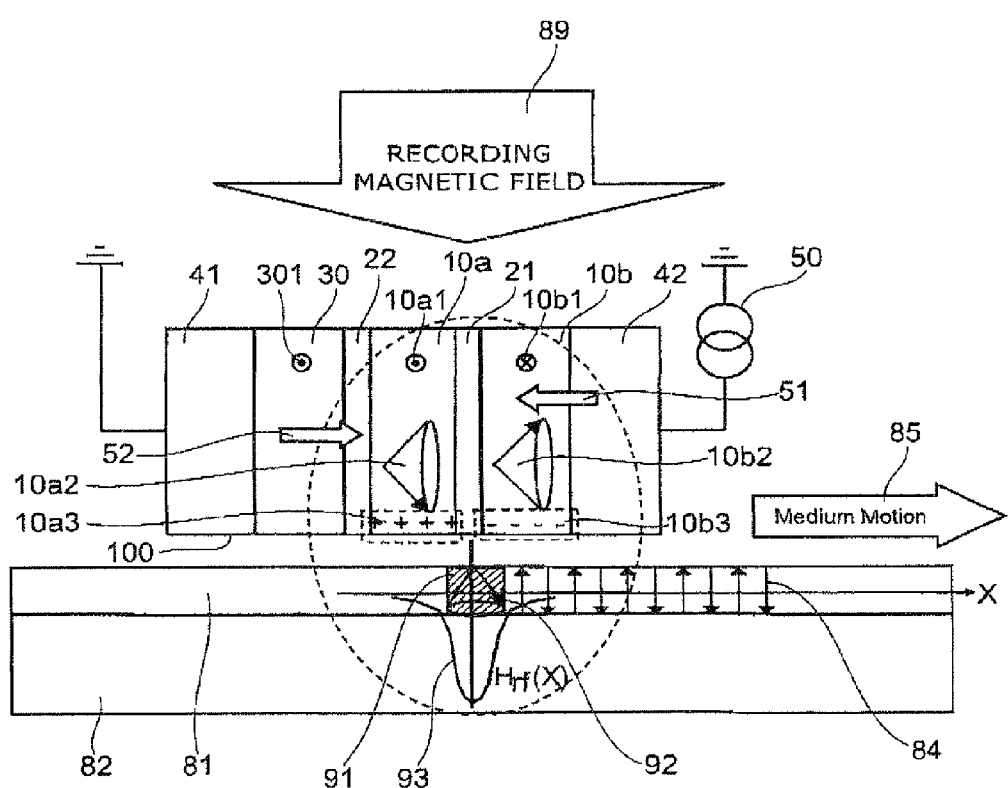
FIGS. 4 and 5 are conceptual views for illustrating the operation of the magnetic recording head of this embodiment.
Figure 5:
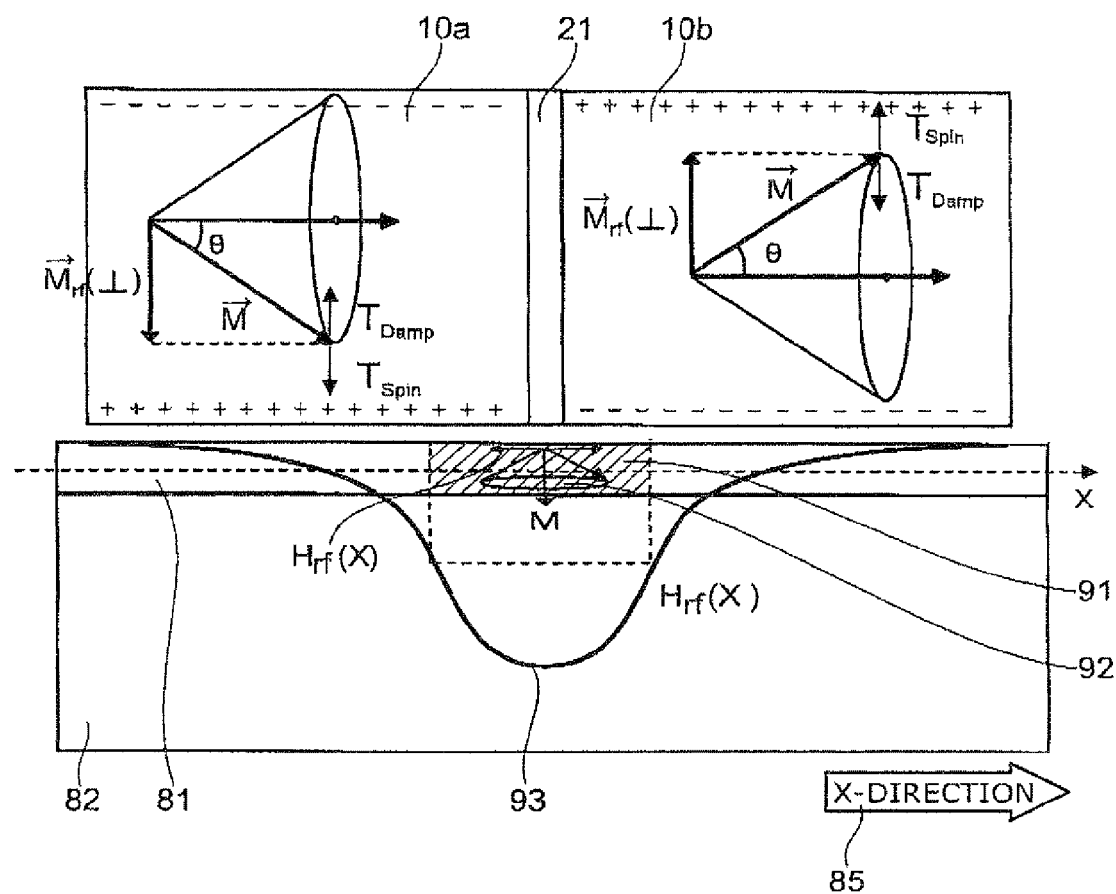

FIGS. 4 and 5 are conceptual views for illustrating the operation of the magnetic recording head of this embodiment. While FIG. 4 illustrates the case where the magnetization 301 of the spin polarization layer 30 is directed in the film plane, the case of the direction perpendicular to the film plane (see FIG. 1B) is almost the same.

When a DC current 51 is passed sequentially through the electrode layer 42, the pair of spin oscillation layers 10b, 10a, and the electrode layer 41, an electron flow 52 is passed in the opposite direction. The spin of the electrons flowing from the electrode layer 41 into the spin polarization layer 30 and passing therethrough is polarized in the direction of the magnetization 301 oriented generally parallel (or generally perpendicular) to the film plane of the spin polarization layer 30. The polarized electron flow 52 travels through the nonmagnetic layer 22 having high spin transmissivity and flows into the first spin oscillation layer 10a.

If the magnetization 10a1 of the first spin oscillation layer 10a is oriented in the film plane, the magnetization 10a1 is directed orthogonal to the magnetization 301, and hence the magnetization 10a1 undergoes ferromagnetic resonance (precession of magnetization) by receiving a large spin torque. Thus a radio-frequency oscillation phenomenon occurs in the first spin oscillation layer 10a in the range of several GHz to over 100 GHz depending on its magnetic characteristics. At this time, the component Mrf($\perp$) perpendicular to the medium plane of the radio-frequency magnetization Mrf occurring in the first spin oscillation layer 10a induces a radio-frequency magnetic charge at the end of the first spin oscillation layer 10a on the air bearing surface 100 side.

As a result of investigations, the inventor has found that such ferromagnetic resonance can be produced irrespective of whether the magnetization 301 of the spin polarization layer 30 is directed generally parallel or generally perpendicular to the film plane. In the case of this example, it turns out that a more prominent ferromagnetic resonance can be produced particularly when the magnetization 301 is generally parallel to the film plane.

Next, the electron flow 52, which has traveled from the first spin oscillation layer 10a and passed through the first nonmagnetic layer 21 having high spin transmissivity, flows into the second spin oscillation layer 10b. Then ferromagnetic resonance occurs also in the second spin oscillation layer 10b on the same principle as the ferromagnetic resonance occurring in the first spin oscillation layer 10a described above. Here, the magnetizations of the first spin oscillation layer 10a and the second spin oscillation layer 10b are antiferromagnetically coupled and/or magnetostatically coupled to each other by suitably selecting the material and thickness of the nonmagnetic layer 21 interposed therebetween. Then the magnetization 10b1 of the second spin oscillation layer 10b is constantly antiparallel to the magnetization 10a1 of the first spin oscillation layer 10a.

If this state is maintained, the magnetization 10b1 of the second spin oscillation layer 10b and the magnetization 10a1 of the first spin oscillation layer 10a are energetically more stable when they undergo precession in opposite phase. Hence, when the second spin oscillation layer 10b undergoes radio-frequency oscillation (precession), the radio-frequency magnetic charge occurring at the end of the second spin oscillation layer 10b on the air bearing surface 100 side is in opposite phase to the above-described radio-frequency magnetic charge at the end of the first spin oscillation layer 10a on the air bearing surface 100 side. Thus, as viewed from the medium, radio-frequency magnetic charges in opposite phase to each other are produced at the respective ends of the pair of spin oscillation layers on the air bearing surface 100 side as shown in FIG. 5. Hence a radio-frequency magnetic field dominated by the component Hrf(x) in the medium plane is generated from the ends of the pair of spin oscillation layers, and can be applied to a recording magnetic layer 81 of the medium, where x denotes the direction of medium motion.

If the magnetic characteristics and thickness of the first spin oscillation layer 10a and the second spin oscillation layer 10b are selected to be equal, Hrf(x) is maximized in the vicinity of the position directly underlying the center of the nonmagnetic layer 21, and its strength is attenuated with the distance from the directly underlying position in the X-direction. More specifically, if the first spin oscillation layer 10a and the second spin oscillation layer 10b have an equal thickness, denoted by t1 (=t2), and saturation magnetization, and the spacing from the pair of spin oscillation layers to the recording layer of the magnetic recording medium is comparable to or smaller than t1, t2, then the resolution (half width) of the distribution 93 of Hrf(x) is approximately expressed by the sum of t1 and t21/2, i.e., t1+(t21/2), where t21 is the thickness of the nonmagnetic layer 21.

By way of example, if t1 and t2 are selected to be 10 nm and t21 to be 1 nm (corresponding to the case where the selected material is Ru and the pair of spin oscillation layers undergo a relatively strong antiferromagnetic coupling), then the half width of the distribution of Hrf(x) is approximately 10.5 nm.

As shown in FIG. 5, when the magnetic head is opposed to the perpendicular magnetic recording medium with the oscillation frequency of the pair of spin oscillation layers set equal to or near the ferromagnetic resonance frequency of the medium magnetization, a radio-frequency magnetic field Hrf(x) directed orthogonal to the perpendicular magnetization M in the recording layer region 91 (corresponding to the resolution as described above) is applied thereto from the pair of spin oscillation layers. Thus the magnetization in the recording layer region 91 of the recording layer 81 undergoes precession due to ferromagnetic resonance, and hence the magnetization in the recording layer region 91 can be reversed very easily.

FIGS. 6A and 6B are schematic views for illustrating the relationship between the magnetization easy axis of the recording layer and the radio-frequency magnetic field.

As shown in FIG. 6A, to efficiently reduce the coercivity of the recording layer 81, it is necessary to apply a radio-frequency magnetic field to the magnetic recording layer 81 in a direction orthogonal to its magnetization easy axis (the orientation direction of magnetization) to impart a torque $T_{Hrf}$ to the magnetization, thereby causing ferromagnetic resonance (precession), in contrast, as shown in FIG. 6B, a radio-frequency magnetic field applied parallel to the magnetization easy axis does not produce an effective torque to the magnetization, and ferromagnetic resonance is difficult to occur. Hence, in the case of using a perpendicular recording medium, to efficiently reduce its coercivity, it is necessary to apply to the recording layer a radio-frequency magnetic field dominated by the component in the medium plane.

However, the radio-frequency magnetic field generated by the spin oscillation layers of the conventional structure disclosed in US Patent Application Publication No. 2005/0023938 and US Patent Application Publication No. 2005/0219771 is dominated by the component perpendicular to the medium plane, and this component is parallel to the magnetization of the recording layer. Hence application of this radio-frequency magnetic field is not effective at causing ferromagnetic resonance (precession) in the magnetization of the recording site. Thus, unfortunately, it is difficult to effectively reduce the coercivity of the recording site.

In contrast, this embodiment enables highly-efficient microwave assisted magnetic recording to a perpendicular magnetic recording medium having high coercivity, which has difficulty in writing by the conventional magnetic recording schemes. Thus it is possible to provide a microwave assisted magnetic recording head suitable for ultrahigh-density magnetic recording in the future, and a microwave assisted magnetic recording apparatus based thereon.

FIG. 7 is a graph illustrating the decrease of coercivity in the recording layer.

Even in a perpendicular magnetic recording medium, the coercivity Hc1 of the recording layer 81 can be decreased to Hc2 by application of a radio-frequency magnetic field in the direction parallel to the medium plane of the recording layer 81. At this time of decreasing the coercivity, a recording magnetic field is applied to the recording layer region 91 from the recording magnetic pole 61 placed close to the pair of spin oscillation layers Then the magnetization of the recording layer region 91 is easily reversed, and writing of information is completed.

According to this embodiment, it is considered that the coercivity can be decreased to ½ to ⅓ or less of the coercivity for no microwave assistance. Hence, by the microwave assisted magnetic recording based on the pair of spin oscillation layers as described above, even a perpendicular magnetic recording medium having a higher magnetic anisotropy energy (i.e., higher coercivity) and a higher recording density potential can be used for recording by the conventional recording magnetic pole 61. Thus this embodiment has a marked effect of being able to continue to increase the recording density of HDD and other magnetic recording apparatuses in the future.

In this embodiment, it is preferable that the magnetic anisotropy energy (Ku) of the first spin oscillation layer 10a be equal or generally equal to that of the second spin oscillation layer 10b. The oscillation frequency of the spin oscillation layer is determined by the magnitude of the magnetic anisotropy energy (Ku) of the device. If the magnetic anisotropy energy (Ku) of the first spin oscillation layer 10a is different from that of the second spin oscillation layer 10b, oscillation of one device is incompatible with oscillation of the other device, failing to achieve the precession in opposite phase as described above.

To achieve microwave assisted magnetic recording with higher resolution, the in-plane component Hrf(x) of the radio-frequency magnetic field generated from the first spin oscillation layer 10a and the second spin oscillation layer 10b is preferably symmetric with respect to the direction of medium motion. To this end, denoting the saturation magnetization and thickness of the first spin oscillation layer 10a and the second spin oscillation layer 10b by Ms1, t1, and Ms2, t2, respectively, it is preferable that the product Ms1×t1 be generally equal to the product Ms2×t2.

Next, various working examples of this embodiment are described.

Figure 8A:
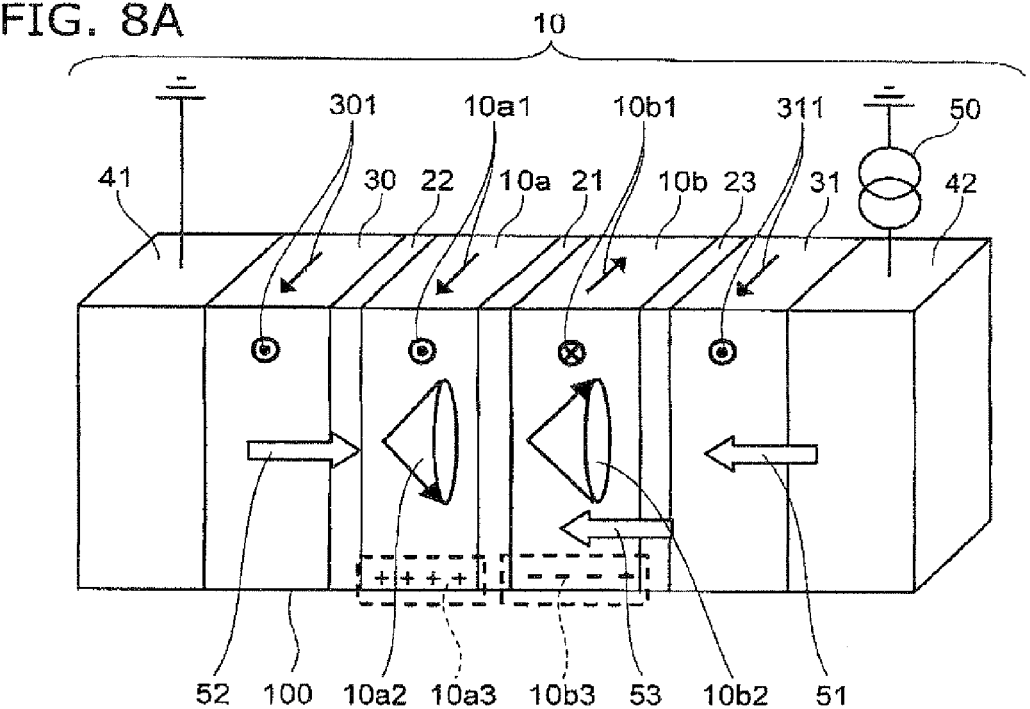
FIGS. 8A and 8B are perspective views showing a magnetic device of a working example of this embodiment.
Figure 8B:
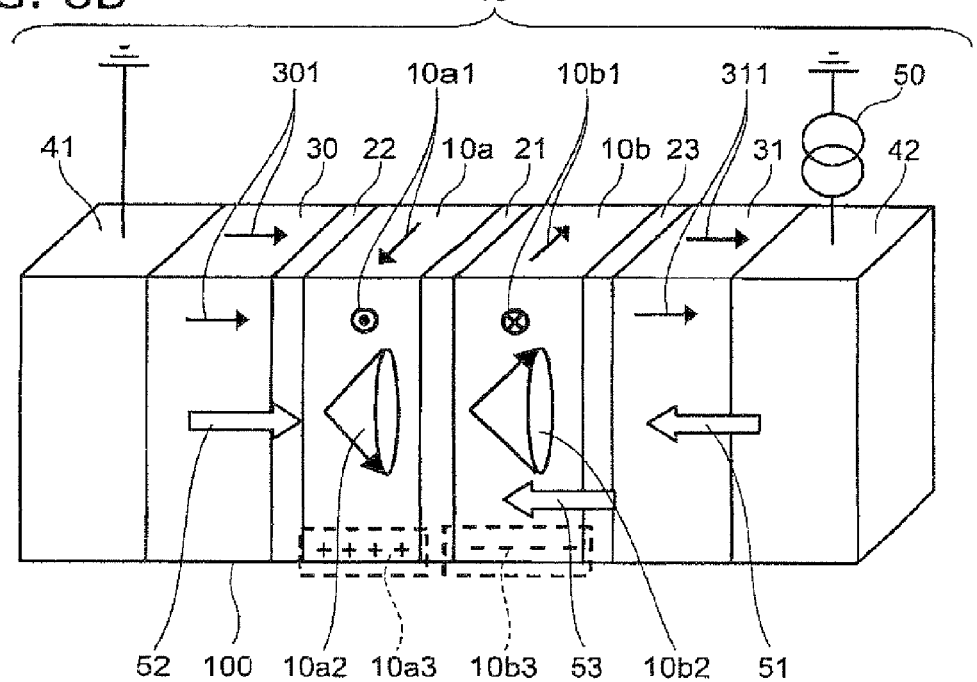

FIGS. 8A and 8B are perspective views showing a magnetic device of a working example of this embodiment.

In the magnetic device of this working example, the configuration from the electrode layer 41 to the second spin oscillation layer 10b (I.e., the second magnetic layer 10b) is the same. However, a nonmagnetic layer 23 illustratively made of Cu or other nonmagnetic metal having good spin transmissivity is laminated on the second spin oscillation layer 10b, and a spin reflection layer 31 and an electrode layer 42 are laminated in this order on the nonmagnetic layer 23.

The orientation of the magnetization 311 of the spin reflection layer 31 is aligned with the orientation of the magnetization 301 of the spin polarization layer 30. Then the electron flow, which has traveled from the second spin oscillation layer 10b and passed through the nonmagnetic layer 23, is reflected in the vicinity of the interface between the spin reflection layer 31 and the nonmagnetic layer 23 to form a reflected electron flow 53. The effect of the reflected electron flow 53 on the pair of spin oscillation layers further facilitates precession particularly in the second spin oscillation layer 10b. Hence even a relatively low DC current 51 can generate the in-plane component Hrf(x) of the radio-frequency magnetic field, which is steep and has high strength and good symmetry.

In the following, this mechanism is described in more detail.

The pair of spin oscillation layers 10a, 10b are antiferromagnetically coupled and/or magnetostatically coupled to each other. Hence, when the electron flow 52 passes through the pair of spin oscillation layers, its spin is reversed. Subsequently, when the electron flow 52 is reflected at the interface between the spin reflection layer 31 and the nonmagnetic layer 23, the spin of the electron flow 52 is reversed once again.

Let e↑ denote the spin of the electron flow 52 that has passed through the first spin oscillation layer 10a to acquire the same orientation as the magnetization 301 of the spin polarization layer 30. Then the electron flow 52 passing through the second spin oscillation layer 10b has the opposite spin e↓. Furthermore, if the magnetization 311 of the spin reflection layer 31 has the same orientation as the magnetization 301 of the spin polarization layer 30, the spin of the reflected electron flow 53 is e↓, which is opposite to the spin of the electron flow 52.

Consequently, in the second spin oscillation layer 10b, the spin of the electron flow 52, e↓, is amplified. Furthermore, the above amplification also applies to the case where the magnetizations 10a1 and 10b1 of the pair of spin oscillation layers are oriented perpendicular to the film plane.

It is noted that the remaining head configuration, operating principle, and effect described above with reference to FIGS. 1 to 7 are also applicable to this working example.

Figure 9A:
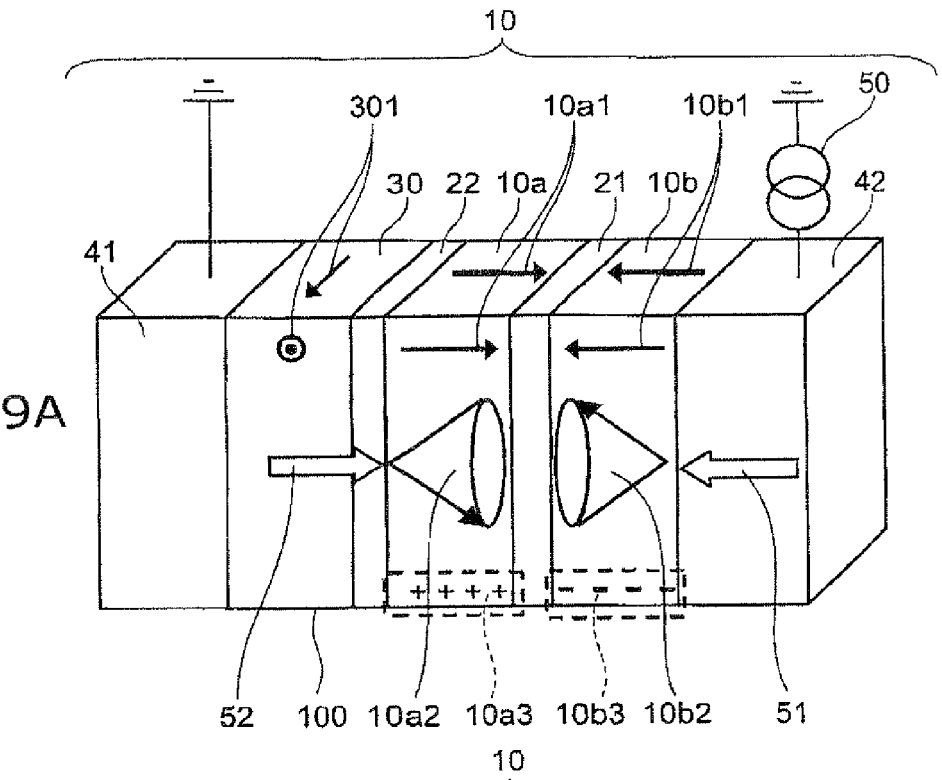
FIGS. 9A and 9B are perspective views showing a magnetic device of another working example of this embodiment.
Figure 9B:
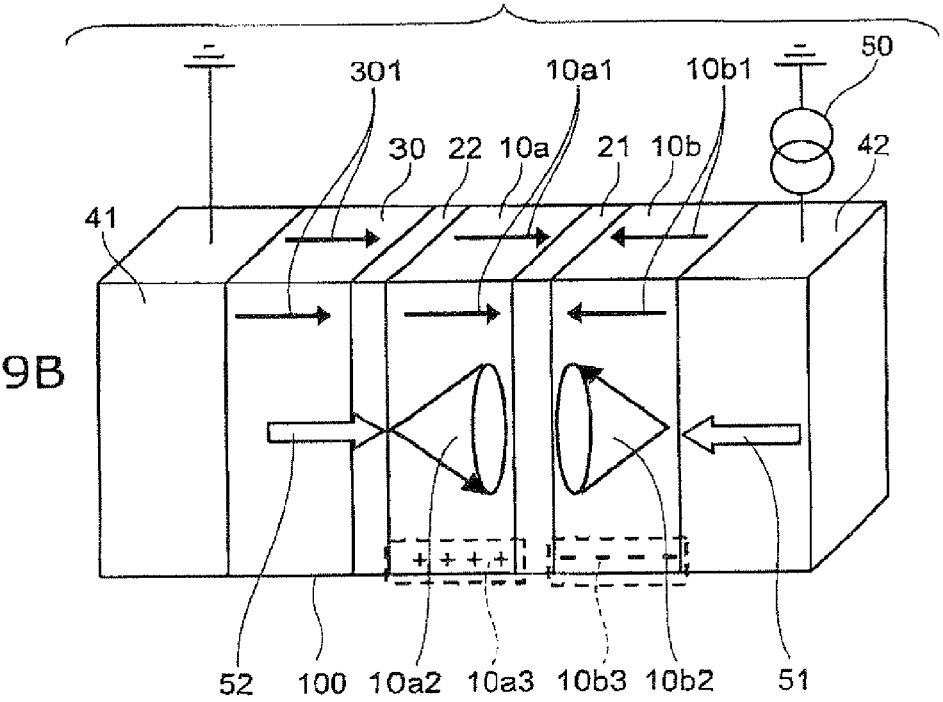

FIGS. 9A and 9B are perspective views showing a magnetic device of another working example of this embodiment.

The magnetic device of this working example has a laminated structure sequentially including an electrode layer 41, a spin polarization layer 30 with its magnetization 301 oriented generally parallel (FIG. 9A) or generally perpendicular (FIG. 9B) to the film plane, a second nonmagnetic layer 22 having good spin transmissivity, a first spin oscillation layer 10a with its magnetization 10a1 oriented perpendicular to the film plane, a first nonmagnetic layer 21, a second spin oscillation layer 10b with its magnetization 10b1 oriented perpendicular to the film plane, and an electrode layer 42.

Even if the magnetizations 10a1 and 10b1 of the pair of spin oscillation layers are oriented perpendicular to the film plane, the pair of spin oscillation layers can be oscillated by orienting the magnetization 301 of the spin polarization layer 30 in the direction generally parallel or generally perpendicular to the film plane. If a perpendicular magnetic recording medium having a higher magnetic anisotropy energy (Ku) is used to achieve a higher recording density, the ferromagnetic resonance frequency is also increased. Hence the oscillation frequency of the pair of spin oscillation layers to be used for microwave assistance also needs to be increased. To this end, the magnetic anisotropy energy (Ku) of the first spin oscillation layer 10a and the second spin oscillation layer 10b constituting the pair of spin oscillation layers also needs to be increased.

In general, many magnetic materials having higher magnetic anisotropy energy (Ku), including the materials of magnetic recording media, have perpendicular magnetic anisotropy, such as CoCrPt-based, CoZrNb-based, FePt-based, and SmCo-based magnetic materials. Hence, also in view of realizing a pair of spin oscillation layers having a high oscillation frequency, the first spin oscillation layer 10a and the second spin oscillation layer 10b need to be made of a magnetic layer having a higher magnetic anisotropy energy (Ku) with its magnetization oriented perpendicular to the film plane. In this respect, according to this working example, oscillation at a higher frequency can be produced also in such a pair of spin oscillation layers. It is noted that the remaining head configuration, operating principle, and effect in this working example can be the same as those described above with reference to FIGS. 1 to 7.

Figure 10A:
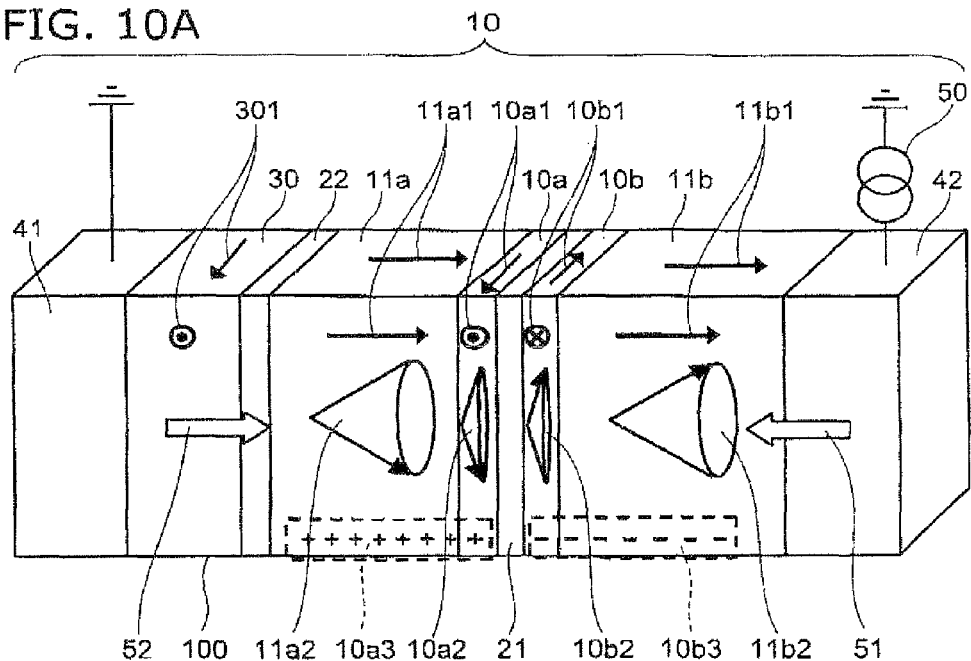
FIGS. 10A and 10B are perspective views showing a magnetic device of still another working example of this embodiment.
Figure 10B:
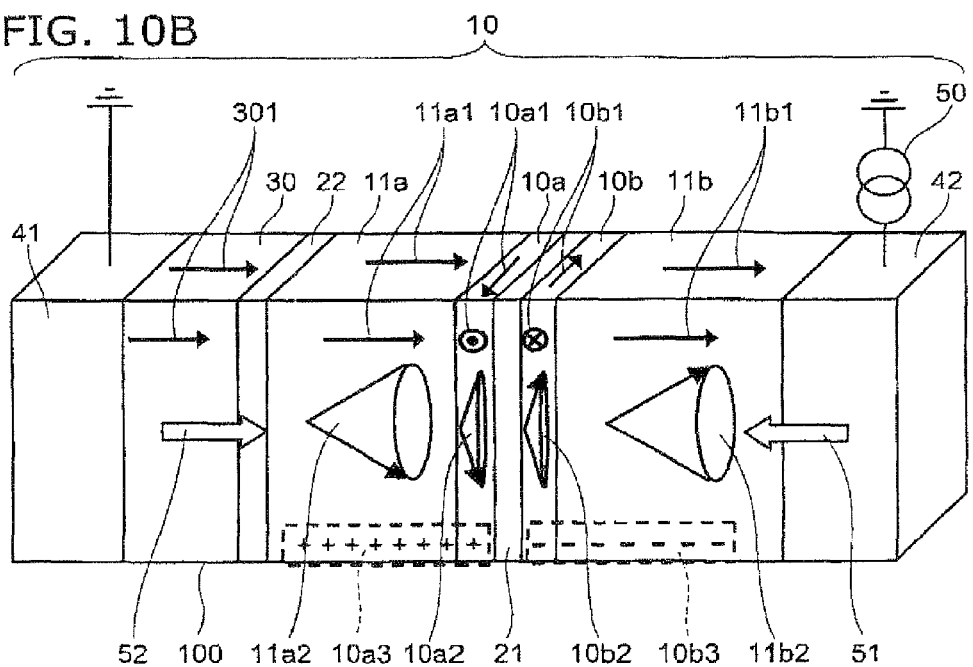

FIGS. 10A and 10B are perspective views showing a magnetic device of still another working example of this embodiment.

The magnetic device of this working example has a laminated structure sequentially including an electrode layer 41, a spin polarization layer 30 with its magnetization 301 oriented generally parallel or generally perpendicular to the film plane, a second nonmagnetic layer 22 having good spin transmissivity, a first spin oscillation layer in which a third magnetic layer 11a with its magnetization oriented perpendicular to the film plane and a fourth magnetic layer 10a with its magnetization oriented in the film plane are laminated in this order, a nonmagnetic layer 21, a second spin oscillation layer in which a fifth magnetic layer 10b with its magnetization oriented in the film plane and a sixth magnetic layer 11b with its magnetization oriented perpendicular to the film plane are laminated in this order, and an electrode layer 42.

Like the working example described above with reference to FIGS. 9A and 9B, the third magnetic layer 11a and the sixth magnetic layer 11b can be fabricated from a CoCrPt-based, CoZrNb-based, FePt-based, SmCo-based or other magnetic material, which has a higher magnetic anisotropy energy (Ku) and tends to be perpendicularly oriented, so that a very high oscillation frequency can be achieved. Furthermore, the fourth magnetic layer 10a and the fifth magnetic layer 10b can be a soft magnetic layer of CoFe or the like with a thickness of approximately several nm, which has a lower magnetic anisotropy energy (Ku) than the third magnetic layer 11a and the sixth magnetic layer 11b, but has a higher saturation magnetic flux density and is thinner than the third magnetic layer 11a and the sixth magnetic layer 11b. Moreover, the first nonmagnetic layer 21 can be illustratively made of Ru as extremely thin as approximately 1 nm. Then a strong antiferromagnetic coupling can be established between the fourth magnetic layer 10a and the fifth magnetic layer 10b. This coupling serves as a compelling force to facilitate the precession of the entire first spin oscillation layer and the entire second spin oscillation layer in opposite phase to each other Furthermore, the distribution of the in-plane component of the radio-frequency magnetic field can be made steeper while its strength is maintained. Consequently, this working example has an effect of being able to achieve microwave assisted magnetic recording suitable for higher-density recording.

Figure 11A:
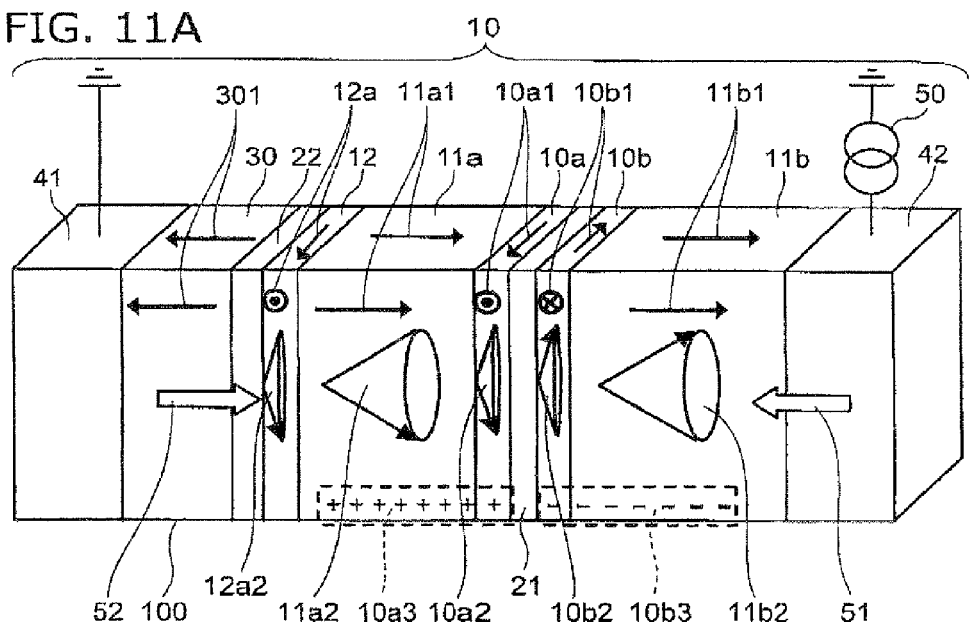
FIGS. 11A and 11B are perspective views showing a magnetic device of still another working example of this embodiment.
Figure 11B:
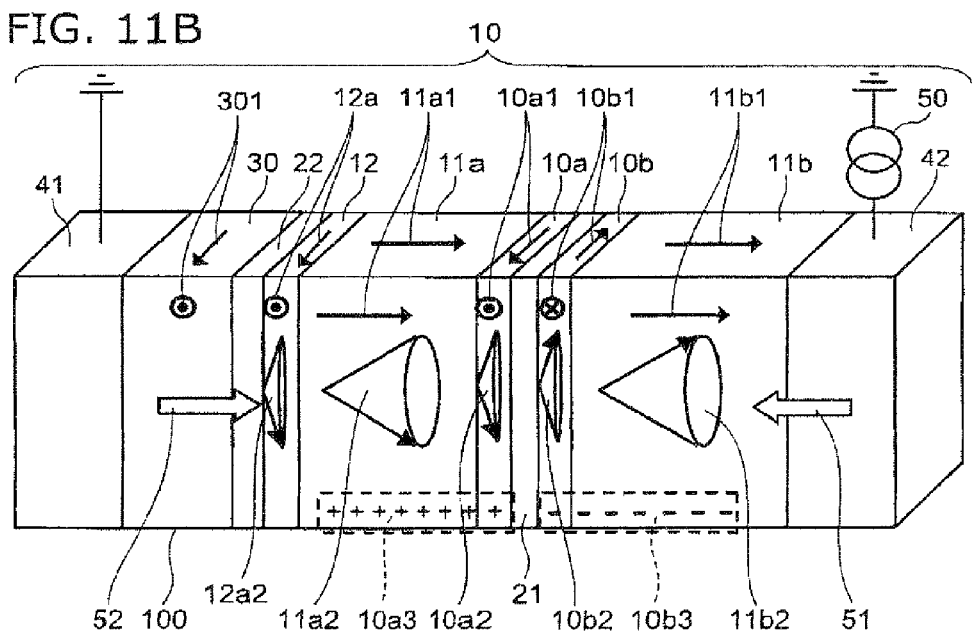

FIGS. 11A and 11B are perspective views showing a magnetic device of still another working example of this embodiment.

The magnetic device of this working example is a variation of that described above with reference to FIGS. 10A and 10B. More specifically, in the first spin oscillation layer, a seventh magnetic layer 12a with its magnetization oriented in the film plane, a third magnetic layer 11a with its magnetization oriented perpendicular to the film plane, and a fourth magnetic layer 10a with its magnetization oriented in the film plane are laminated in this order. In the second spin oscillation layer, a fifth magnetic layer 10b with its magnetization oriented in the film plane and a sixth magnetic layer 11b with its magnetization oriented perpendicular to the film plane are laminated in this order.

The spin polarization layer 30 has a magnetization 301 oriented generally perpendicular or generally parallel to the film plane.

The seventh magnetic layer 12a can be an ultrathin soft magnetic layer of CoFe or the like with a thickness of approximately several nm. This advantageously facilitates the radio-frequency oscillation of the pair of spin oscillation layers in this working example even at a lower DC current 51. Furthermore, the radio-frequency oscillation frequency can be made variable, or tunable, by changing the value of this current. This enables microwave assisted magnetic recording to be properly operated by suitably adjusting the current 51 in accordance with any change of the material characteristics of the magnetic recording medium.

Let Ms7, t7 denote the saturation magnetization and thickness of the seventh magnetic layer 12a. The sum of the product Ms7×t7, the above-described product Ms3×t3, and the above-described product Ms4×t4 is set generally equal to the sum of the above-described product Ms5×t5 and the above-described product Ms6×t6. Thus the in-plane component Hrf (x) of the radio-frequency magnetic field can be made symmetric and steep with respect to the direction of medium motion, achieving microwave assisted magnetic recording with high resolution.

Figure 12A:
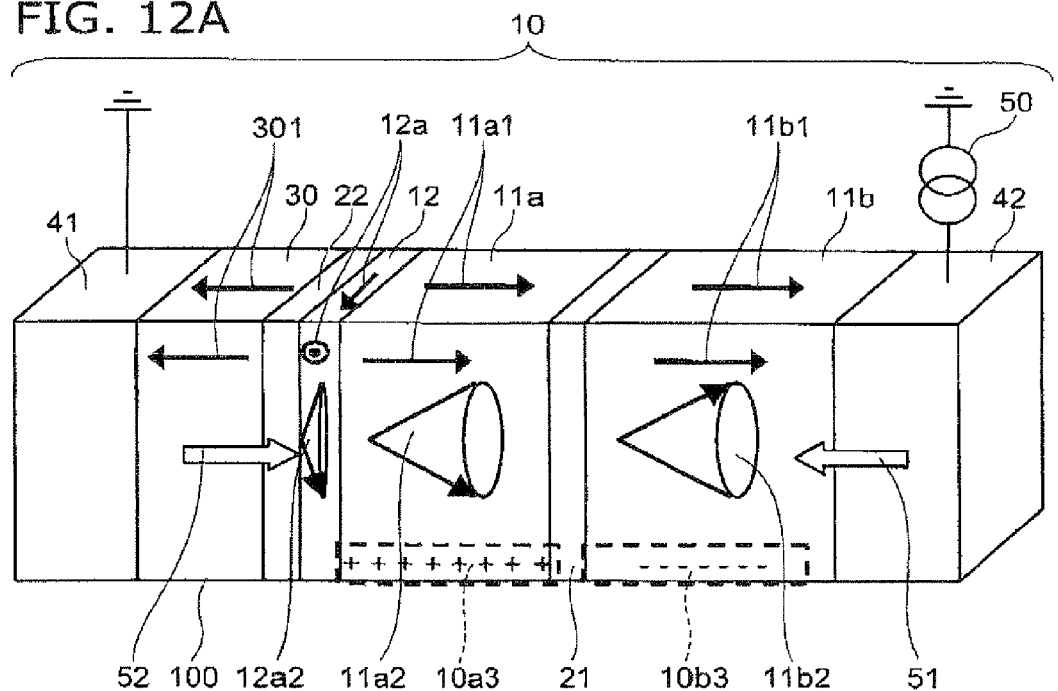
FIGS. 12A and 12B are perspective views showing a magnetic device of still another working example of this embodiment.
Figure 12B:
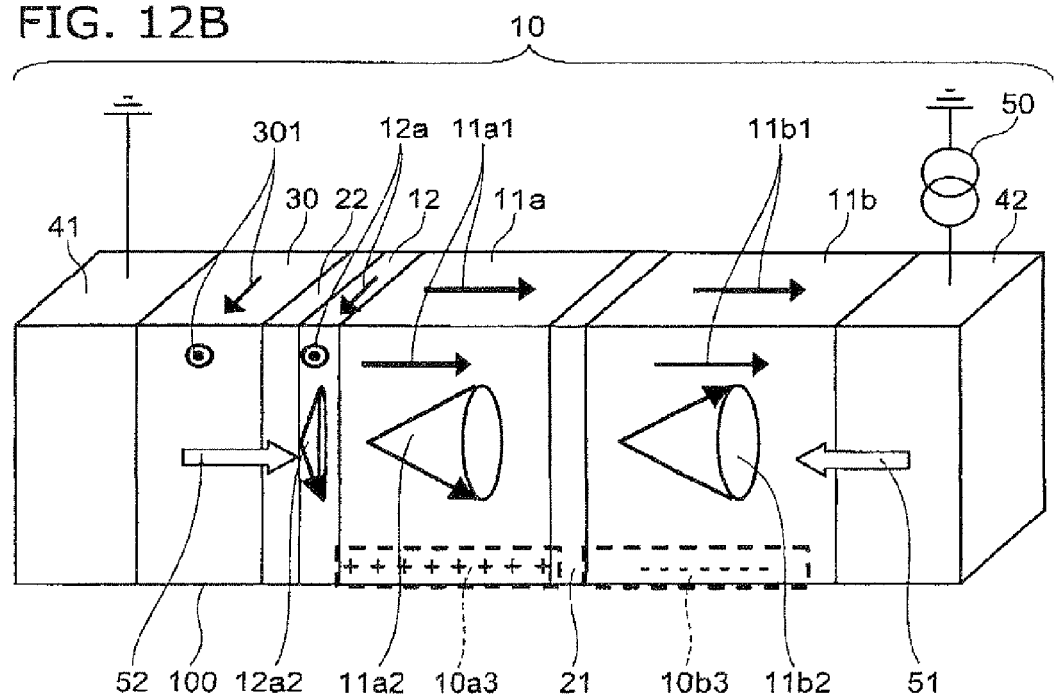

FIGS. 12A and 12B are perspective views showing a magnetic device of still another working example of this embodiment.

The magnetic device of this working example is a variation of that described above with reference to FIGS. 11A and 11B. More specifically, in the first spin oscillation layer, a seventh magnetic layer 12a with its magnetization oriented in the film plane and a third magnetic layer 11a with its magnetization oriented perpendicular to the film plane are laminated in this order. The second spin oscillation layer includes a sixth magnetic layer 11b with its magnetization oriented perpendicular to the film plane.

The spin polarization layer 30 has a magnetization oriented generally perpendicular or generally parallel to the film plane.

Also in this working example, the seventh magnetic layer 12a can be an ultrathin soft magnetic layer of CoFe or the like with a thickness of approximately several nm. This advantageously facilitates the radio-frequency oscillation of the pair of spin oscillation layers in this working example even at a lower DC current 51. Furthermore, the radio-frequency oscillation frequency can be made variable, or tunable, by changing the value of this current. This enables microwave assisted magnetic recording to be properly operated by suitably adjusting the current 51 in accordance with any change of the material characteristics of the magnetic recording medium.

The working examples of the magnetic device of this embodiment have been described.

Next, working examples of the magnetic head of this embodiment are described.

Figure 13:
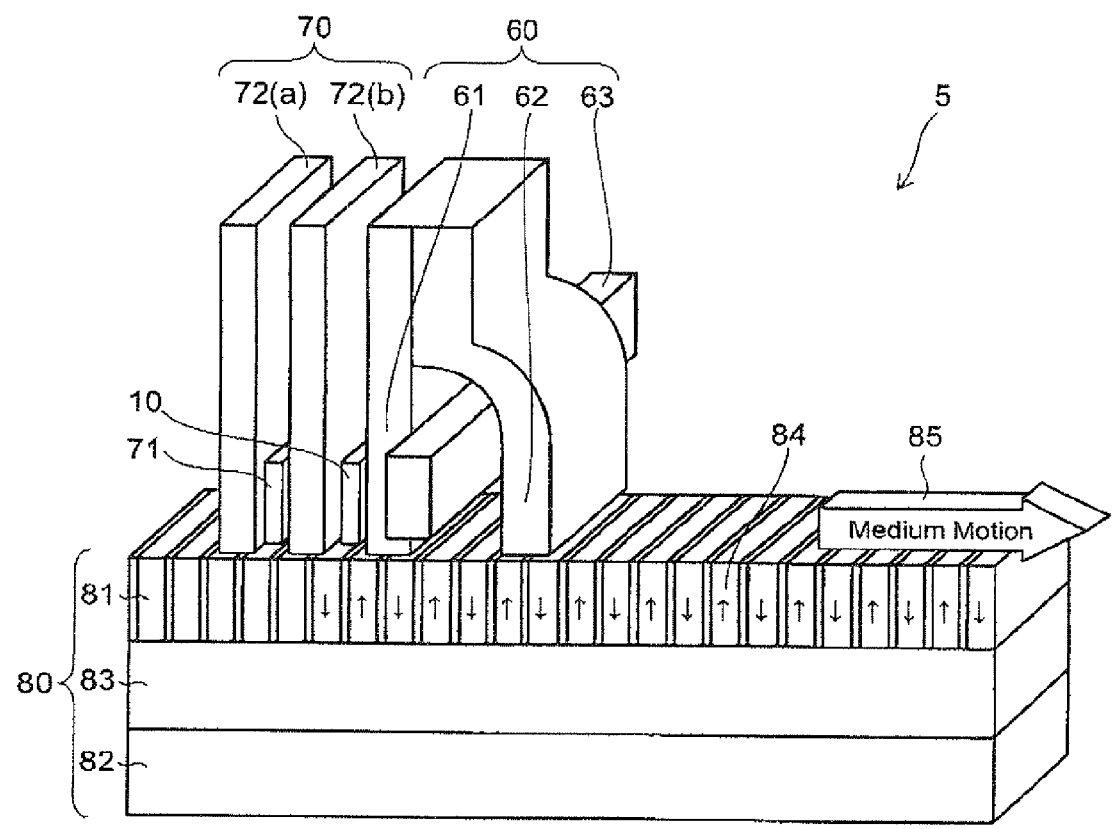
FIG. 13 is a perspective view showing the main part of the magnetic head of a working example of this embodiment.

FIG. 13 is a perspective view showing the main part of the magnetic head of a working example of this embodiment.

The distribution of the in-plane component of the radio-frequency magnetic field generated by the pair of spin oscillation layers provided in any one of the magnetic devices 10 described above with reference to FIGS. 1 to 12 can be made finer and steeper. The recording resolution is almost determined by the distribution of this radio-frequency magnetic field. Hence, as shown in FIG. 13, it is perfectly acceptable that the magnetic device 10 having the pair of spin oscillation layers is placed close to the leading edge side of the recording magnetic pole 61. That is, even in this configuration, the magnetic recording resolution can be determined by the pair of spin oscillation layers provided in the magnetic device 10. Furthermore, in this sense, it is perfectly acceptable that the width in the track direction of the recording magnetic pole is wider than the width in the track width direction of the pair of spin oscillation layers provided in the magnetic device 10.

Figure 14:
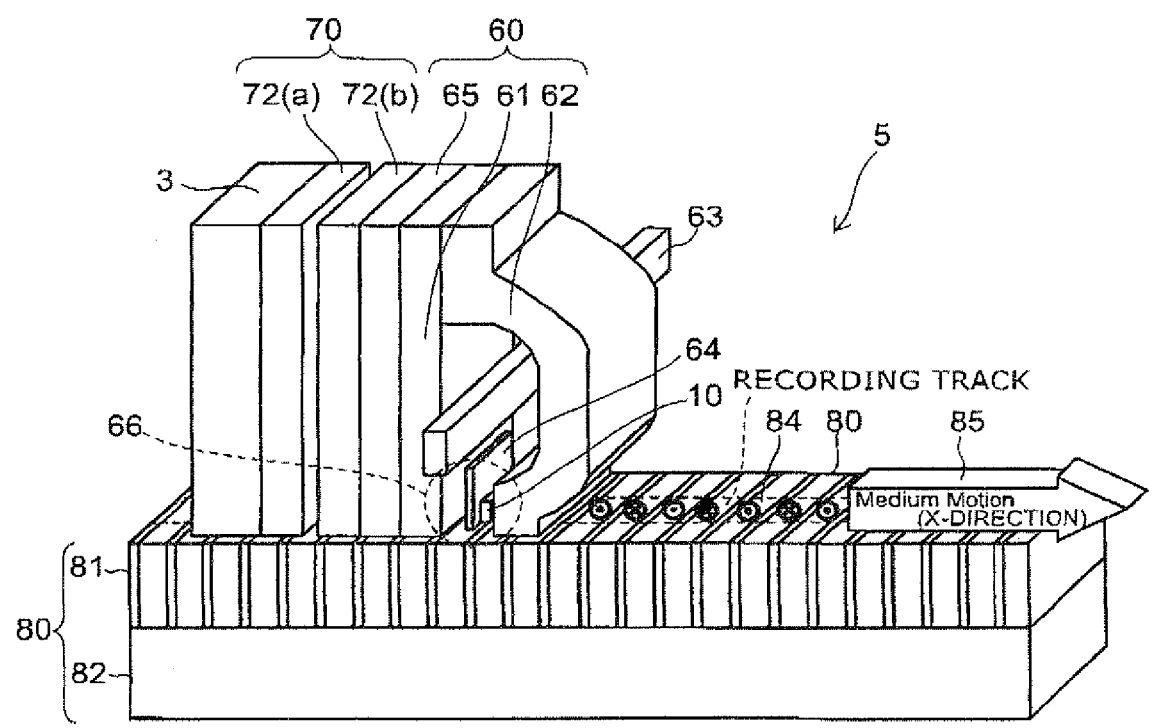
FIG. 14 is a perspective view showing the main part of the magnetic head of another working example of this embodiment.

FIG. 14 is a perspective view showing the main part of the magnetic head of another working example of this embodiment.

Figure 15:
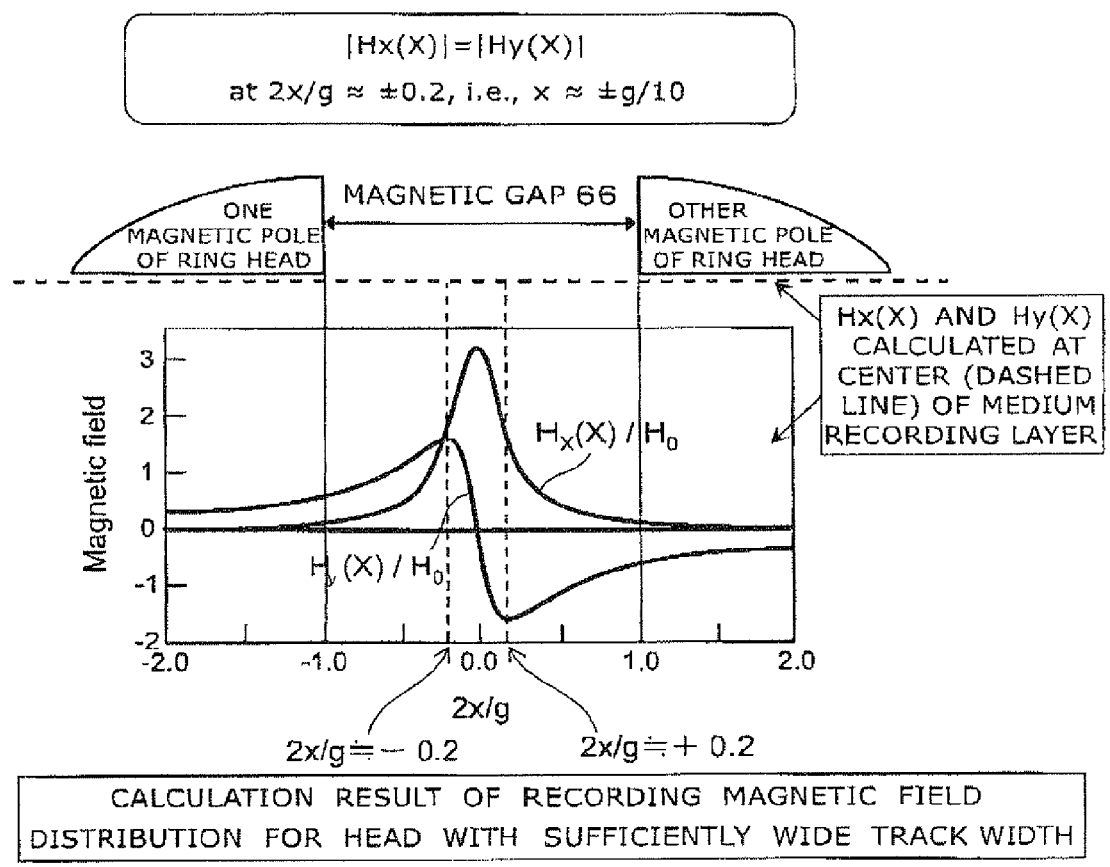
FIG. 15 is a schematic diagram showing an example analysis result of the recording magnetic field applied.

FIG. 15 is a schematic diagram showing an example analysis result of the in-plane component Hx(X) and the perpendicular component Hy(X) of the recording magnetic field applied from a ring-shaped recording head to a recording medium. In the figure, g denotes the gap length, and Ho denotes the magnetic field strength in the gap.

Figure 16:
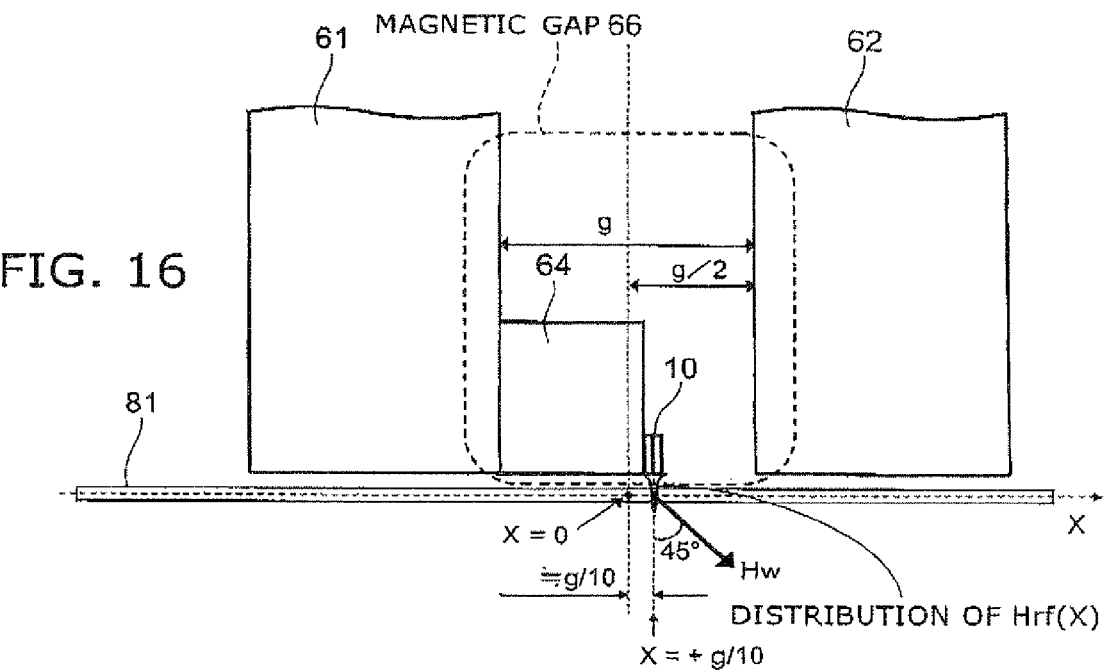
FIGS. 16 and 17 are enlarged cross-sectional views of the main part of the head showing the installation position of the pair of spin oscillation layers in this working example
Figure 17:
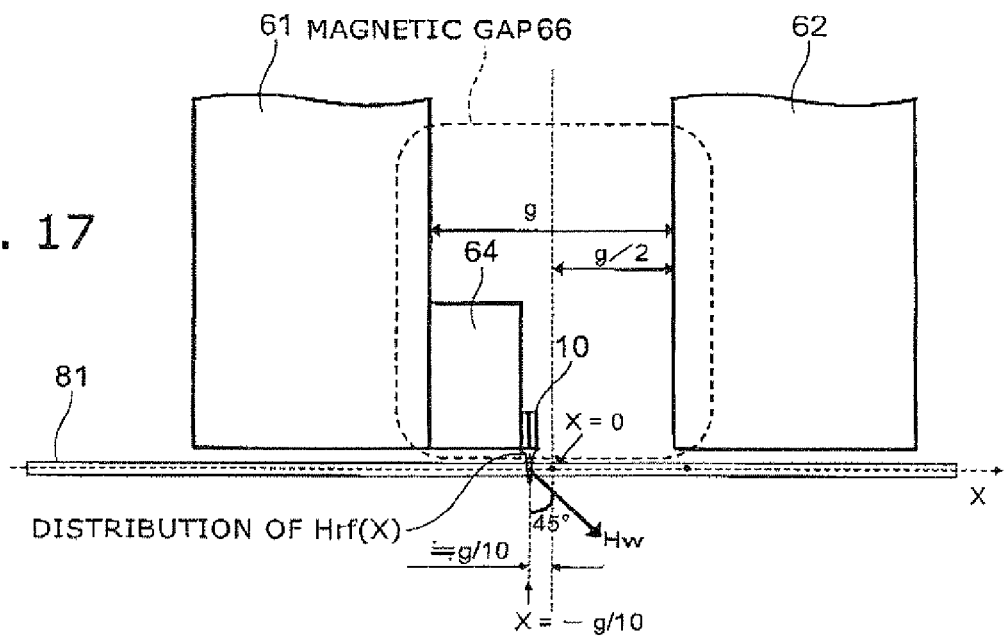

FIGS. 16 and 17 are enlarged cross-sectional views of the main part of the head showing the installation position of the pair of spin oscillation layers in this working example.

As shown in FIG. 14, in this working example, along the direction of medium motion 85, a shield-type GMR head 70 and a recording head 60 composed of a main magnetic pole 61, an auxiliary magnetic pole 62, a magnetic gap 66, and a coil 63 are formed in this order on the sidewall of a magnetic head slider 3. The magnetic device 10 having the pair of spin oscillation layers is placed in a magnetic gap formed between the main magnetic pole 61 and the auxiliary magnetic pole 62 of the recording head 60. That is, the magnetic device 10 having the pair of spin oscillation layers is placed on the leading edge side of the main magnetic pole 61.

Also in this working example, the magnetic recording medium 80 is assumed to be a perpendicular magnetic recording medium. Because the distribution of the in-plane component of the radio-frequency magnetic field generated by the pair of spin oscillation layers provided in the magnetic device 10 is fine and steep, the recording resolution of the microwave assisted magnetic recording is determined by the spatial distribution of this radio-frequency magnetic field. Hence the three-dimensional size of the recording head 60, that is, the widths thickness, and other dimensions of the main magnetic pole 61 and the auxiliary magnetic pole 62 and the width (g) of the magnetic gap can be sufficiently larger than those of the pair of spin oscillation layers 10. Thus, if the magnetic device 10 having the pair of spin oscillation layers is placed about midway in the track width direction of the magnetic gap, a uniform and sufficiently large recording magnetic field can be applied to the medium recording site assisted with the magnetic device 10.

In perpendicular magnetic recording media, the magnetic particles constituting the recording layer can be almost regarded as single-domain particles. Hence the coercivity Hc of the magnetic particle is maximized when the recording magnetic field Hw is parallel to the magnetization M of the magnetic particle, and Hc decreases by half when Hw forms an angle of 45° with M. This means that magnetization reversal (i.e., recording) can be achieved by a lower magnetic field if the recording magnetic field is applied obliquely with respect to the medium magnetization M.

As seen from FIG. 15, the in-plane component Hx(X) (in the X-direction, i.e., the direction of medium motion in FIG. 14) and the perpendicular component Hy(X) of the recording magnetic field applied to the medium recording layer from the magnetic gap of the ring-shaped recording head are equal in absolute value at positions generally ±g/10 away from the center of the magnetic gap, represented by X=0. That is, the magnetization of the perpendicularly magnetized medium receives an oblique 45-degree recording magnetic field in the vicinity of X=±g/10. Hence, as shown in FIGS. 16 and 17, if the center position of the pair of spin oscillation layers of the magnetic device 10 (i.e., the position of the nonmagnetic layer 21 separating the pair of spin oscillation layers) is placed at X=±g/10 in the magnetic gap 66, an oblique 45-degree recording magnetic field can be applied to the medium recording site, where the radio-frequency magnetic field Hrf (X) is to be applied. Thus the recording efficiency is doubled as compared with the conventional case where the recording magnetic field is perpendicularly applied.

This effect of enhancing the recording efficiency can be readily achieved also in the working examples shown in FIGS. 2 and 13 by suitably setting the position of the pair of spin oscillation layers of the magnetic device 10 with respect to the main magnetic pole 61 or the auxiliary magnetic pole 62.

Figure 18:
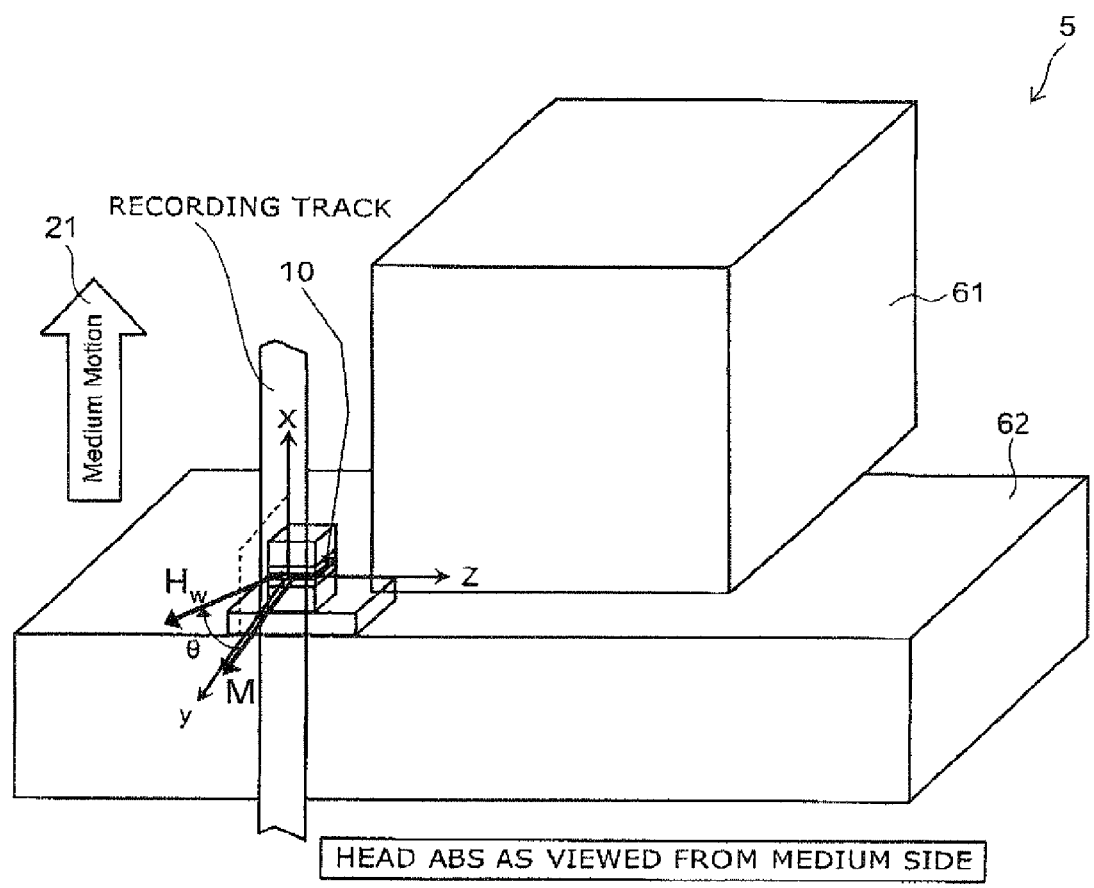
FIG. 18 is a perspective view showing the main part of the magnetic head of still another working example of this embodiment.

FIG. 18 is a perspective view showing the main part of the magnetic head of still another working example of this embodiment.

The recording head 5 of this working example includes a main magnetic pole 61, an auxiliary magnetic pole 62 forming a magnetic core (not entirely shown) in combination with the main magnetic pole 61, and a coil (not shown) coupling the main magnetic pole 61 with the auxiliary magnetic pole 62. The magnetic recording medium is assumed to be a perpendicular magnetic recording medium. In this working example, the magnetic device 10 having the pair of spin oscillation layers described above with reference to FIGS. 1 to 12 is placed close to both the main magnetic pole 61 and the auxiliary magnetic pole 62 beside the main magnetic pole 61 in the track width direction and above the auxiliary magnetic pole 62.

According to this working example, particularly in the case where the three-dimensional size of the recording head is sufficiently larger than the pair of spin oscillation layers 10, a recording magnetic field Hw having sufficient strength and inclined (angle θ) with respect to the magnetization M (Y-direction) of the medium recording layer can be applied to the medium recording site, which is microwave assisted by the pair of spin oscillation layers provided in the magnetic device 10. By suitably setting the position of the pair of spin oscillation layers of the magnetic device 10, Hw with θ=45° can be applied to the medium recording site. This enables highly-efficient information recording as in the working examples described above with reference to FIGS. 14 to 17.

Next, a magnetic recording apparatus according to the embodiment of the invention is described. More specifically, the magnetic device 10 or the magnetic recording head of the invention described with reference to FIGS. 1 to 18 is illustratively incorporated in an integrated recording-reproducing magnetic head assembly, which can be installed on a magnetic recording/reproducing apparatus.

Figure 19:
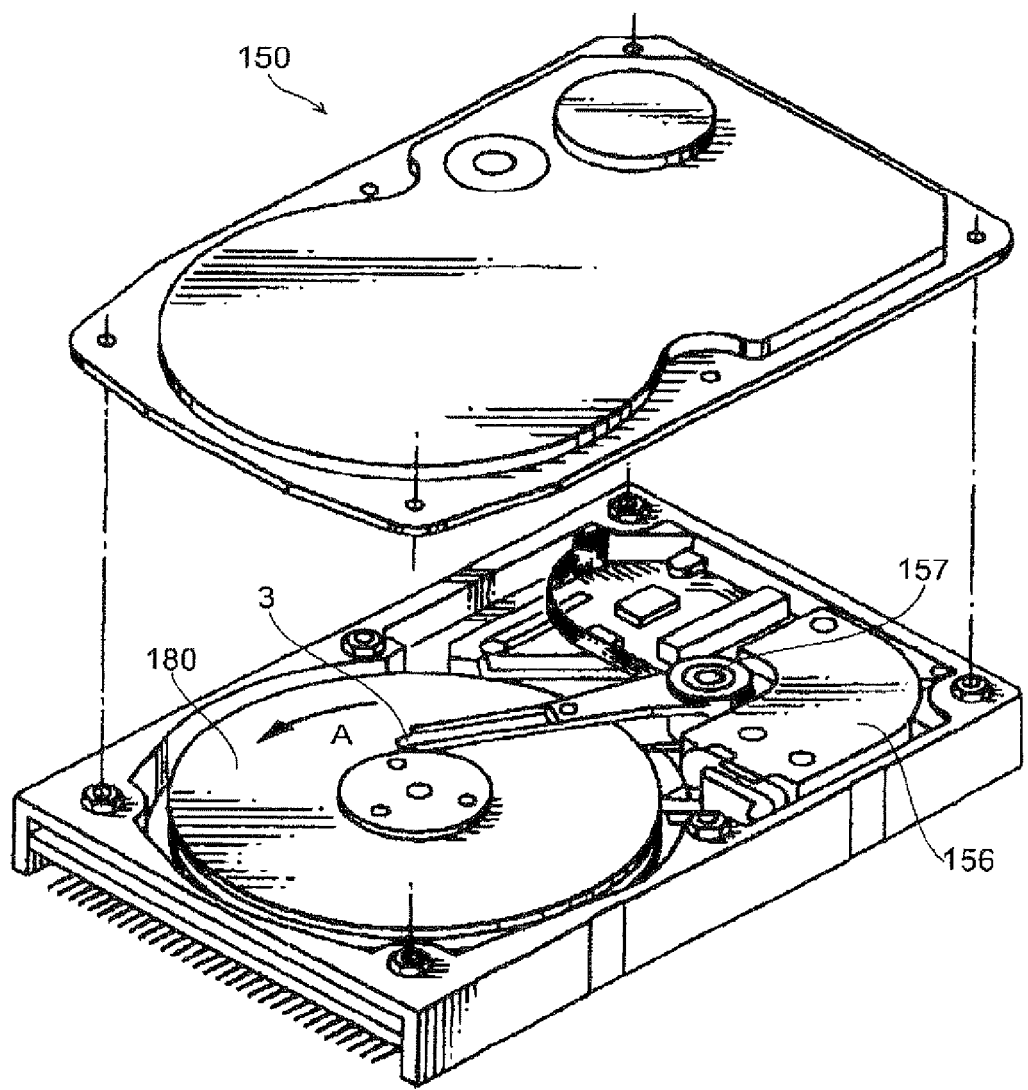
FIG. 19 is a principal perspective view illustrating the schematic configuration of such a magnetic recording/reproducing apparatus.

FIG. 19 is a principal perspective view illustrating the schematic configuration of such a magnetic recording/reproducing apparatus. More specifically, the magnetic recording/reproducing apparatus 150 of the invention is an apparatus based on a rotary actuator. In this figure, a recording medium disk 180 is mounted on a spindle 152 and rotated in the direction of arrow A by a motor, not shown, in response to a control signal from a drive controller, not shown. The magnetic recording/reproducing apparatus 150 of the invention may include a plurality of medium disks 180.

A head slider 3 for recording/reproducing information stored on the medium disk 180 has a configuration as described above with reference to FIG. 3 and is attached to the tip of a thin-film suspension 154. Here, the magnetic device 10 or the magnetic recording head according to any one of the above working examples is illustratively installed near the tip of the head slider 3.

When the medium disk 180 is rotated, the air bearing surface (ABS) of the head slider 3 is held at a prescribed floating amount from the surface of the medium disk 180. Alternatively, it is also possible to use a slider of the so-called "contact-traveling type", where the slider is in contact with the medium disk 180.

The suspension 154 is connected to one end of an actuator arm 155 including a bobbin for holding a driving coil, not shown. A voice coil motor 156, which is a kind of linear motors is provided on the other end of the actuator arm 155. The voice coil motor 156 is composed of the driving coil, not shown, wound up around the bobbin of the actuator arm 155 and a magnetic circuit including a permanent magnet and an opposed yoke disposed so as to sandwich the coil therebetween.

The actuator arm 155 is held by ball bearings, not shown, provided at two positions above and below the spindle 157, and can be slidably rotated by the voice coil motor 156.

Figure 20:
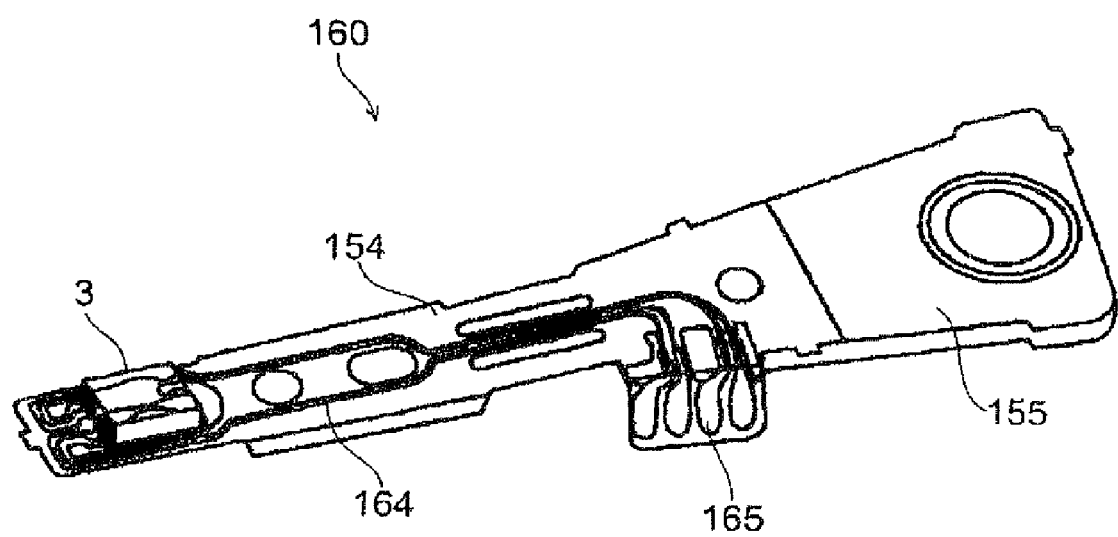
FIG. 20 is an enlarged perspective view of the magnetic head assembly ahead of the actuator arm 155 as viewed from the disk side.

FIG. 20 is an enlarged perspective view of the magnetic head assembly ahead of the actuator arm 155 as viewed from the disk side. More specifically, the magnetic head assembly 160 has an actuator arm 155 illustratively including a bobbin for holding a driving coil, and a suspension 154 is connected to one end of the actuator arm 155.

To the tip of the suspension 154 is attached a head slider 3 including any one of the magnetic devices 10 or the magnetic recording heads described above with reference to FIGS. 1 to 18. The suspension 154 has a lead 164 for writing and reading signals. The lead 164 is electrically connected to each electrode of the magnetic head incorporated in the head slider 3. In the figure, the reference numeral 165 denotes an electrode pad of the magnetic head assembly 160.

According to the invention, by using the magnetic device 10 or the magnetic recording head of the invention as described above with reference to FIGS. 1 to 18, it is possible to reliably record information on the perpendicular magnetic recording medium disk 180 with higher recording density than conventional.

Figure 21:
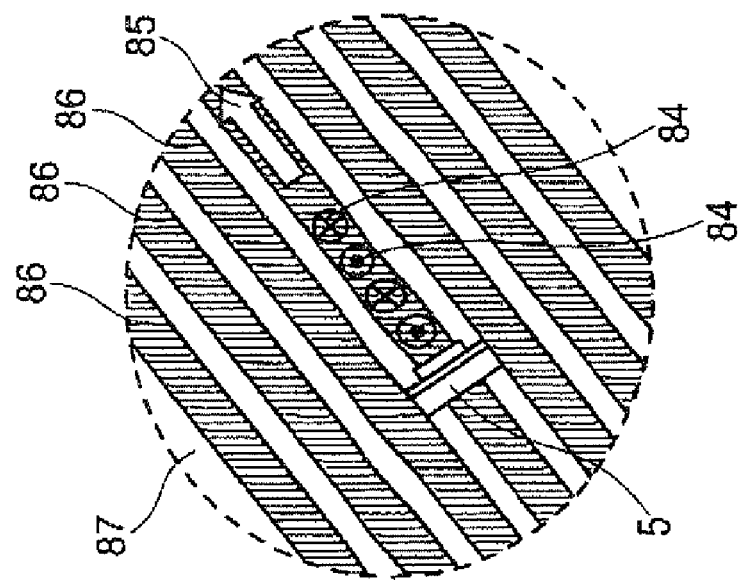
FIG. 21 is a schematic view illustrating a magnetic recording medium that can be used in this embodiment.
Figure 21:
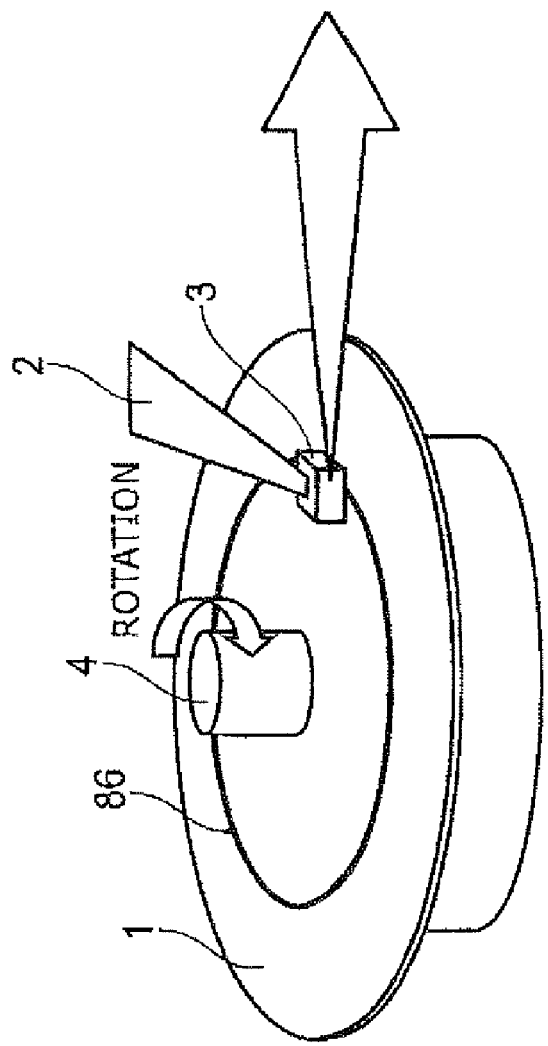

FIG. 21 is a schematic view illustrating a magnetic recording medium that can be used in this embodiment.

More specifically, the magnetic recording medium 1 of this embodiment includes magnetic discrete tracks 86 separated from each other by a nonmagnetic material 87. When this medium 1 is rotated by a spindle motor 4 and moved toward the direction of medium motion 85, a recording magnetization 84 can be produced by the magnetic recording head 5 described above with reference to FIGS. 1 to 18.

Figure 22:
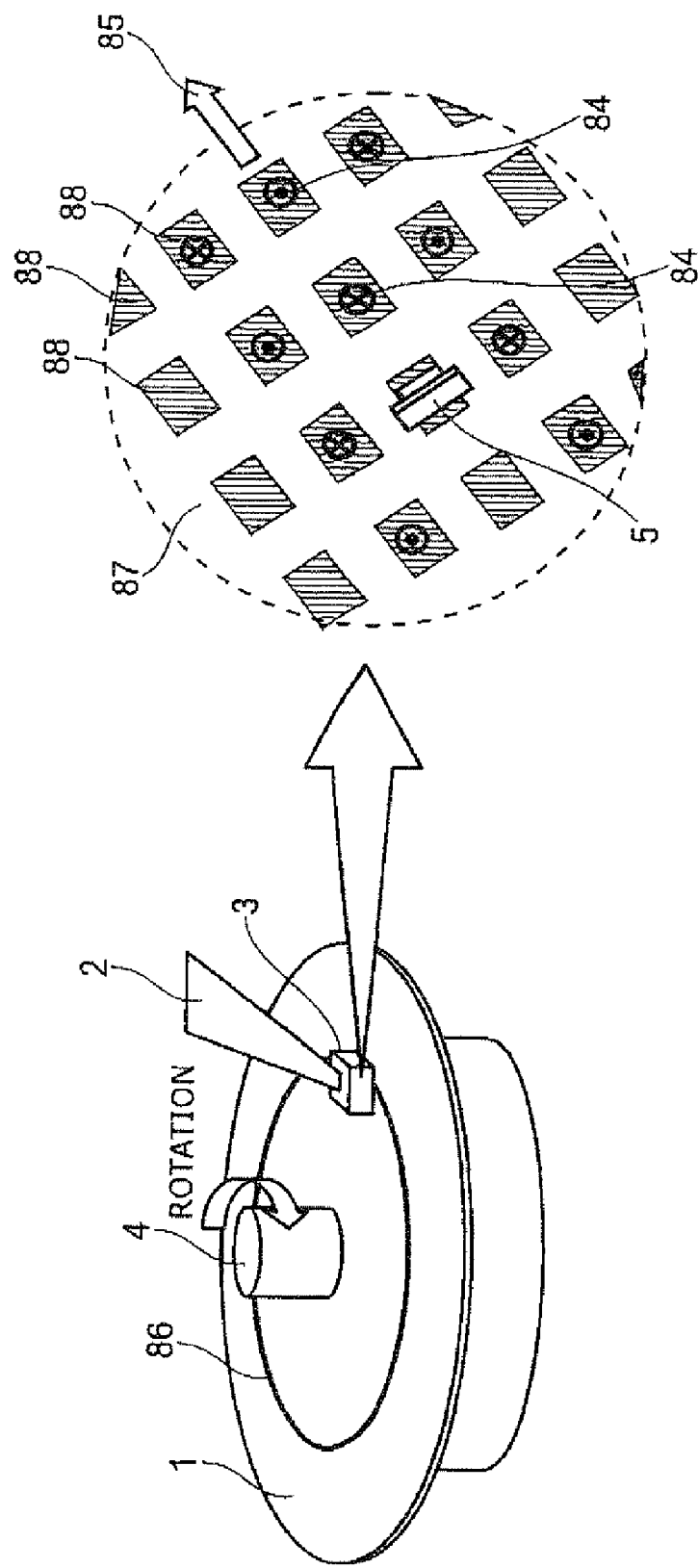
FIG. 22 is a schematic view illustrating another magnetic recording medium that can be used in this embodiment.

FIG. 22 is a schematic view illustrating another magnetic recording medium that can be used in this embodiment.

More specifically, the magnetic recording medium 1 of this example includes magnetic discrete bits 88 separated from each other by a nonmagnetic material 87. When this medium 1 is rotated by a spindle motor 4 and moved toward the direction of medium motion 85, a recording magnetization 84 can be produced by the magnetic recording head 5 described above with reference to FIGS. 1 to 18.

According to the invention, as shown in FIGS. 21 and 22, recording can be reliably performed also on the recording layer having high coercivity in a discrete-type magnetic recording medium 1, allowing magnetic recording with high density and high speed.

The embodiment of the invention has been described with reference to the examples. However, the invention is not limited to the above examples. For instance, two or more of the examples described above with reference to FIGS. 1 to 22 can be combined as long as technically feasible, and such combinations are also encompassed within the scope of the invention.

That is, the invention is not limited to the examples, but can be practiced in various modifications without departing from the spirit thereof, and such modifications are all encompassed within the scope of the invention.

The invention claimed is:

1. A magnetic recording head, comprising:
a recording magnetic pole;
a magnetic device juxtaposed with the recording magnetic pole; and
a magnetic reproducing device,
the magnetic device including:
   a first magnetic layer having at least one magnetic material layer;
   a second magnetic layer having at least one magnetic material layer;
   a first nonmagnetic layer provided between the first magnetic layer and the second magnetic layer;
   a third magnetic layer including a ferromagnetic material with a magnetization oriented in a parallel or perpendicular direction to a film plane; and
   a pair of electrodes operable to pass a current through a laminated body including the first and second magnetic layers, the first nonmagnetic layer, and the third magnetic layer,
wherein
the first magnetic layer has a saturation magnetization $Ms1$ and a thickness $t1$,
the second magnetic layer has a saturation magnetization $Ms2$ and a thickness $t2$, and $Ms1 \times t1$ is generally equal to $Ms2 \times t2$.

2. A magnetic recording head, comprising:
a recording magnetic pole;
a magnetic device juxtaposed with the recording magnetic pole; and
a magnetic reproducing device,
the magnetic device including:
   a first magnetic layer having at least one magnetic material layer;
   a second magnetic layer having at least one magnetic material layer;
   a first nonmagnetic layer provided between the first magnetic layer and the second magnetic layer;
   a third magnetic layer including a ferromagnetic material with a magnetization oriented in a parallel or perpendicular direction to a film plane; and
   a pair of electrodes operable to pass a current through a laminated body including the first and second magnetic layers, the first nonmagnetic layer, and the third magnetic layer,
wherein
the first magnetic layer is formed by sequentially laminating a first magnetic material layer with its magnetization oriented generally parallel to film plane, a second magnetic material layer with its magnetization oriented generally perpendicular to film plane, and a third magnetic material layer with its magnetization oriented generally parallel to film plane,
the second magnetic layer is formed by sequentially laminating a fourth magnetic material layer with its magnetization oriented generally parallel to film plane and a fifth magnetic material layer with its magnetization oriented generally perpendicular to film plane, and
the magnetization of the third magnetic layer is oriented generally parallel or generally perpendicular to film plane.

3. The magnetic recording head according to claim 2, wherein
the second magnetic material layer has a saturation magnetization $Ms2$ and a thickness $t2$,
the third magnetic material layer has a saturation magnetization $Ms3$ and a thickness $t3$,
the fourth magnetic material layer has a saturation magnetization $Ms4$ and a thickness $t4$,
the fifth magnetic material layer has a saturation magnetization $Ms5$ and a thickness $t5$,
the first magnetic material layer has a saturation magnetization $Ms1$ and a thickness $t1$, and
the sum of $Ms1 \times t1$, $Ms2 \times t2$, and $Ms3 \times t3$ is generally equal to the sum of $Ms4 \times t4$ and $Ms5 \times t5$.

4. A magnetic recording head comprising:
a recording magnetic pole;
a magnetic device juxtaposed with the recording magnetic pole; and
a magnetic reproducing device,
the magnetic device including:
   a first magnetic layer having at least one magnetic material layer;
   a second magnetic layer having at least one magnetic material layer;
   a first nonmagnetic layer provided between the first magnetic layer and the second magnetic layer;
   a third magnetic layer including a ferromagnetic material with a magnetization oriented in a parallel or perpendicular direction to a film plane; and
   a pair of electrodes operable to pass a current through a laminated body including the first and second magnetic layers, the first nonmagnetic layer, and the third magnetic layer,
   wherein the first magnetic layer and the second magnetic layer have a generally equal magnetic anisotropy energy.

5. The magnetic recording head according to claim 4, wherein the first magnetic layer and the second magnetic layer are antiferromagnetically coupled and/or magnetostatically coupled to each other.

6. The magnetic recording head according to claim 4, wherein the magnetic device further includes:
a fourth magnetic layer laminated on a first surface of the second magnetic layer via a second nonmagnetic layer, the first surface being opposite to a second surface of the second magnetic layer, the second surface being in contact with the first nonmagnetic layer.

7. The magnetic recording head according to claim 4, wherein
the magnetization of the first magnetic layer and the second magnetic layer is oriented generally parallel to film plane, and
the magnetization of the third magnetic layer is oriented generally parallel or generally perpendicular to film plane.

8. The magnetic recording head according to claim 4, wherein
the magnetization of the first magnetic layer and the second magnetic layer is oriented generally perpendicular to film plane, and
the magnetization of the third magnetic layer is oriented generally parallel or generally perpendicular to film plane.

9. The magnetic recording head according to claim 4, wherein
- the first magnetic layer includes a first magnetic material layer with its magnetization oriented generally perpendicular to film plane and a second magnetic material layer with its magnetization oriented generally parallel to film plane,
- the second magnetic layer includes a third magnetic material layer with its magnetization oriented generally parallel to film plane and a fourth magnetic material layer with its magnetization oriented generally perpendicular to film plane,
- the first nonmagnetic layer is laminated between the second magnetic material layer and the third magnetic material layer, and
- the magnetization of the third magnetic layer is oriented generally parallel or generally perpendicular to film plane.

10. The magnetic recording head according to claim 9, wherein
- the first magnetic material layer and the fourth magnetic material layer have a generally equal magnetic anisotropy energy,
- the second magnetic material layer and the third magnetic material layer have a generally equal magnetic anisotropy energy,
- the magnetic anisotropy energy of the second magnetic material layer and the third magnetic material layer is lower than any of the magnetic anisotropy energies of the first magnetic material layer and the fourth magnetic material layer, and
- the thickness of the second magnetic material layer and the third magnetic material layer is smaller than any of the thicknesses of the first magnetic material layer and the fourth magnetic material layer.

11. The magnetic recording head according to claim 9, wherein
- the magnetic anisotropy energy of the second magnetic material layer and the third magnetic material layer is lower than any of the magnetic anisotropy energies of the first magnetic material layer and the fourth magnetic material layer,
- the first magnetic material layer has a saturation magnetization $Ms1$ and a thickness $t1$,
- the second magnetic material layer has a saturation magnetization $Ms2$ and a thickness $t2$,
- the third magnetic material layer has a saturation magnetization $Ms3$ and a thickness $t3$,
- the fourth magnetic material layer has a saturation magnetization $Ms4$ and a thickness $t4$, and
- the sum of $Ms1 \times t1$ and $Ms2 \times t2$ is generally equal to the sum of $Ms3 \times t3$ and $Ms4 \times t4$.

12. The magnetic recording head according to claim 4, wherein the magnetic device is provided on the trailing side of the recording magnetic pole.

13. The magnetic recording head according to claim 4, wherein the magnetic device is provided on the leading side of the recording magnetic pole.

14. The magnetic recording head according to claim 4, wherein the width in the recording track width direction of the recording magnetic pole is larger than the width in the recording track width direction of the first and second magnetic layers.

15. The magnetic recording head according to claim 4, wherein
- the recording magnetic pole includes a main magnetic pole and an auxiliary magnetic pole, and
- the magnetic device is provided between the main magnetic pole and the auxiliary magnetic pole.

16. The magnetic recording head according to claim 4, wherein
- the recording magnetic pole includes a main magnetic pole and an auxiliary magnetic pole, and
- the magnetic device is provided beside the main magnetic pole in the recording track width direction and on the trailing side of the auxiliary magnetic pole.

* * * * *